US009629166B2

(12) United States Patent
Wei et al.

(10) Patent No.: US 9,629,166 B2
(45) Date of Patent: *Apr. 18, 2017

(54) COEXISTENCE BETWEEN LEGACY CARRIER TYPES AND NEW CARRIER TYPES

(71) Applicant: QUALCOMM Incorporated, San Diego, CA (US)

(72) Inventors: Yongbin Wei, San Diego, CA (US); Hao Xu, San Diego, CA (US); Durga Prasad Malladi, San Diego, CA (US); Tingfang Ji, San Diego, CA (US); Wanshi Chen, San Diego, CA (US); Tao Luo, San Diego, CA (US); Peter Gaal, San Diego, CA (US); Jelena M. Damnjanovic, San Diego, CA (US); Aleksandar Damnjanovic, San Diego, CA (US); Naga Bhushan, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 613 days.

This patent is subject to a terminal disclaimer.

(21) Appl. No.: 13/890,129

(22) Filed: May 8, 2013

(65) Prior Publication Data

US 2013/0301566 A1 Nov. 14, 2013

Related U.S. Application Data

(60) Provisional application No. 61/646,224, filed on May 11, 2012, provisional application No. 61/649,188, filed on May 18, 2012.

(51) Int. Cl.
*H04W 72/04* (2009.01)
*H04W 76/02* (2009.01)
(Continued)

(52) U.S. Cl.
CPC .......... *H04W 72/048* (2013.01); *H04L 5/00* (2013.01); *H04W 76/026* (2013.01);
(Continued)

(58) Field of Classification Search
CPC .......... H04W 72/048; H04W 76/026; H04W 72/0453; H04W 48/16; H04W 5/001;
(Continued)

(56) References Cited

U.S. PATENT DOCUMENTS 7,885,214 B2   2/2011   Ahmadi et al.
2006/0148493 A1 * 7/2006   Narasimha et al. .......... 455/458
(Continued)

FOREIGN PATENT DOCUMENTS

WO   2010048178 A1   4/2010
WO   2011038243 A2   3/2011

OTHER PUBLICATIONS

HTC: "Synchronization Signals and Procedure for Unsynchronised New Carriers," 3GPP Draft; R1-121407 Synchronization Signals and Procedure for Unsynchronised New Carriers. 3rd Generation Partnership Project (3GPP), Mobile Competence Centre; 650, Route Des Lucioles; F-06921SOPHIA-Antipolis Cedex; France, vol. RAN WG1, No. Jeju, Korea; Mar. 26, 2012-Mar. 30, 2012, Mar. 20, 2012 (Mar. 20, 2012), XP050599694.
(Continued)

*Primary Examiner* — Gbemileke J Onamuti
(74) *Attorney, Agent, or Firm* — Seyfarth Shaw LLP

(57) ABSTRACT

A method of wireless communication occurs in a frequency band having a first set of resources associated with a first carrier type and a second set of resources associated with a second carrier type. In one configuration, the first carrier type is a new carrier type and the second carrier type is a legacy carrier type. Legacy UEs may only receive signals from the second carrier type. However, new UEs may
(Continued)

receive signals from both the first carrier type and the second carrier type. Therefore, to provide backward compatibility while supporting new UEs, an eNodeB may signal support of the first carrier type to a new UE while maintaining signaling with legacy UEs. Additionally, the eNodeB may restrict operations of a UE to the first set of resources or second set of resources.

50 Claims, 18 Drawing Sheets

(51) Int. Cl.
*H04L 5/00* (2006.01)
*H04W 48/16* (2009.01)

(52) U.S. Cl.
CPC ............ *H04L 5/001* (2013.01); *H04L 5/0048* (2013.01); *H04L 5/0053* (2013.01); *H04L 5/0091* (2013.01); *H04W 48/16* (2013.01); *H04W 72/0453* (2013.01)

(58) Field of Classification Search
CPC ....... H04L 5/00; H04L 5/0048; H04L 5/0053; H04L 5/0091
See application file for complete search history.

(56) References Cited

U.S. PATENT DOCUMENTS

| | | |
|---|---|---|
| 2010/0029318 A1* | 2/2010 | Tano ................ H04W 52/16 455/522 |
| 2010/0227569 A1 | 9/2010 | Bala et al. |
| 2011/0081856 A1 | 4/2011 | Johansson et al. |
| 2011/0103243 A1 | 5/2011 | Larsson et al. |
| 2011/0312316 A1 | 12/2011 | Baldemair et al. |
| 2012/0039179 A1 | 2/2012 | Seo et al. |
| 2012/0039284 A1 | 2/2012 | Barbieri et al. |
| 2012/0106499 A1 | 5/2012 | Seo et al. |
| 2012/0250558 A1 | 10/2012 | Chung et al. |
| 2013/0010964 A1 | 1/2013 | Fong et al. |
| 2013/0051214 A1* | 2/2013 | Fong et al. ................ 370/216 |
| 2013/0242880 A1 | 9/2013 | Miao et al. |
| 2013/0301565 A1* | 11/2013 | Xu et al. ................ 370/329 |
| 2014/0050206 A1 | 2/2014 | Seo et al. |
| 2014/0112285 A1* | 4/2014 | Darwood et al. ............ 370/329 |

OTHER PUBLICATIONS

International Search Report and Written Opinion—PCT/US2013/040436—ISA/EPO—Oct. 17, 2013.
Mediatek Inc: "Discussion on Carrier Type Indication for Bandwidth Extension in LTE-Advanced," 3GPP Draft; R1-094059 Discussion on Carrier Type Indication for Bandwidth Extension in LTEA, 3rd Generation Partnership Project (3GPP), Mobile Competence Centre ., 650, Route Des Lucioles, F-06921 Sophia-Antipolis Cedex, France, No. Miyazaki; Oct. 12, 2009, Oct. 12, 2009 (2009-Ie-12), XP050388543, pp. 4.
Motorola Mobility: "Additional Carrier Types for LTE Rel-11," 3GPP Draft; R1-113260, Additional Carrier Types for REL-11-, 3rd Generation Partnership Project (3GPP), Mobile Competence Centre; 650, Route Des Lucioles; F-06921 Sophia-Antipolis Cedex; France, vol. RAN WG1, No. Zhuhai; Oct. 10, 2011, Oct. 4, 2011 (Oct. 4, 2011), XP050538370, pp. 2.
Nokia Siemens Networks., et al., "Considerations on Unsynchronised New Carrier Types", 3GPP Draft; R1-121267, 3rd Generationpartnership Project (3GPP), Mobile Competence Cener; 650, Route Des Lucioles; F-06921 Sophia-Antipolis Cedex; France, vol. RAN WG1, No. Jeju, Korea; Mar. 26, 2012-Mar. 30, 2012, Mar. 20, 2012 (Mar. 20, 2012), XP050599556, [retrieved on Mar. 20, 2012].
Alcatel-Lucent S B., Remaining Issues of PSS and SSS for Unsynchronised New Carriers, R1-121230, 3GPP, Mar. 23, 2012.
LG Electronics, "Issues on the CM Increase Due to the Repeated DL RS Pattern", R1-090209, 3GPP, Jan. 8, 2009.
Nokia Siemens Networks, Nokia, "PSS/SSS and Unsynchronized New Carrier Type", R1-121268, 3GPP, Mar. 20, 2012.

* cited by examiner

| SF 0 | SF 1 | SF 2 | SF 3 | SF 4 | SF 5 | SF 6 | SF 7 | SF 8 | SF 9 |
|------|------|------|------|------|------|------|------|------|------|
| LCT  | LCT  | LCT  | LCT  | LCT  | NCT  | NCT  | NCT  | NCT  | NCT  |

*FIG. 12A*

| SF 0 | SF 1 | SF 2 | SF 3 | SF 4 | SF 5 | SF 6 | SF 7 | SF 8 | SF 9 |
|------|------|------|------|------|------|------|------|------|------|
| LCT  | LCT  | NCT  | LCT/NCT | LCT/NCT | LCT | LCT/NCT | LCT/NCT | LCT/NCT | LCT/NCT |

*FIG. 12B*

COEXISTENCE BETWEEN LEGACY CARRIER TYPES AND NEW CARRIER TYPES

CROSS-REFERENCE TO RELATED APPLICATIONS

This application claims the benefit under 35 U.S.C. §119(e) to U.S. Provisional Patent Application No. 61/646,224 entitled "COEXISTENCE BETWEEN LEGACY CARRIER TYPES AND NEW CARRIER TYPES," filed on May 11, 2012, and U.S. Provisional Patent Application No. 61/649,188 entitled "COEXISTENCE BETWEEN LEGACY CARRIER TYPES AND NEW CARRIER TYPES," filed on May 18, 2012, the disclosures of which are expressly incorporated by reference herein in their entireties.

BACKGROUND

Field

Aspects of the present disclosure relate generally to wireless communication systems, and more particularly to coexistence between legacy carrier types and new carrier types.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

SUMMARY

A method of wireless communication occurs in a frequency band having a first set of resources associated with a first carrier type and a second set of resources associated with a second carrier type. In one configuration, the first carrier type is a new carrier type and the second carrier type is a legacy carrier type. Legacy UEs may only receive signals from the second carrier type. However, new UEs may receive signals from both the first carrier type and the second carrier type. Therefore, to provide backward compatibility while supporting new UEs, an eNodeB may signal support of the first carrier type to a new UE while maintaining signaling with legacy UEs. Additionally, the eNodeB may restrict operations of a UE to the first set of resources or second set of resources.

In one aspect of the present disclosure, a method of wireless communication is disclosed. The method includes transmitting resources on a carrier. The resources include a first set of resources associated with a first carrier type and a second set of resources associated with a second carrier type. The method also includes indicating that the carrier is either the first carrier type or the second carrier type. The method further includes restricting operations of a UE to the first set of resources or the second set of resources.

Another aspect of the present disclosure discloses an apparatus including means for transmitting resources on a carrier. The resources include a first set of resources associated with a first carrier type and a second set of resources associated with a second carrier type. The apparatus also includes means for indicating that the carrier is either the first carrier type or the second carrier type. The apparatus further includes means for restricting operations of a UE to the first set of resources or the second set of resources.

In another aspect of the present disclosure, a computer program product for wireless communications in a wireless network having a non-transitory computer-readable medium is disclosed. The computer readable medium has non-transitory program code recorded thereon which, when executed by the processor(s), causes the processor(s) to perform operations of transmitting resources on a carrier. The resources include a first set of resources associated with a first carrier type and a second set of resources associated with a second carrier type. The program code also causes the processor(s) to indicate that the carrier is either the first carrier type or the second carrier type. The program code further causes the processor(s) to restrict operations of a UE to the first set of resources or the second set of resources.

Another aspect of the present disclosure includes a wireless communication apparatus having a memory and at least one processor coupled to the memory. The processor(s) is configured to transmit resources on a carrier, the resources including a first set of resources associated with a first carrier type and a second set of resources associated with a second carrier type. The processor(s) is also configured to indicate that the carrier is either the first carrier type or the second carrier type. The processor(s) is further configured to restrict operations of a UE to the first set of resources or the second set of resources.

In one aspect of the present disclosure, a method of wireless communication is disclosed. The method includes receiving resources on a carrier. The resources include a first set of resources associated with a first carrier type and a second set of resources associated with a second carrier type. The method also includes determining whether the carrier is the first carrier type or the second carrier type. The method further includes receiving a restriction of operations to the first set of resources or the second set of resources.

Another aspect of the present disclosure discloses an apparatus including means for receiving resources on a carrier. The resources include a first set of resources associated with a first carrier type and a second set of resources associated with a second carrier type. The apparatus also includes means for determining whether the carrier is the first carrier type or the second carrier type. The apparatus further includes means for receiving a restriction of operations to the first set of resources or the second set of resources.

In another aspect of the present disclosure, a computer program product for wireless communications in a wireless network having a non-transitory computer-readable medium is disclosed. The computer readable medium has non-transitory program code recorded thereon which, when executed by the processor(s), causes the processor(s) to perform operations of receiving resources on a carrier. The resources include a first set of resources associated with a first carrier type and a second set of resources associated with a second carrier type. The program code also causes the processor(s) to determine whether the carrier is the first carrier type or the second carrier type. The program code further causes the processor(s) to receive a restriction of operations to the first set of resources or the second set of resources.

Another aspect of the present disclosure includes a wireless communication apparatus having a memory and at least one processor coupled to the memory. The processor(s) is configured to receive resources on a carrier. The resources include a first set of resources associated with a first carrier type and a second set of resources associated with a second carrier type. The processor(s) is also configured to determine whether the carrier is the first carrier type or the second carrier type. The processor(s) is further configured to receive a restriction of operations to the first set of resources or the second set of resources.

Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

FIGS. 12A and 12B are block diagrams illustrating subframe partitioning for legacy carrier types and new carrier types according to aspects of the disclosure.

DETAILED DESCRIPTION

Figure 1:
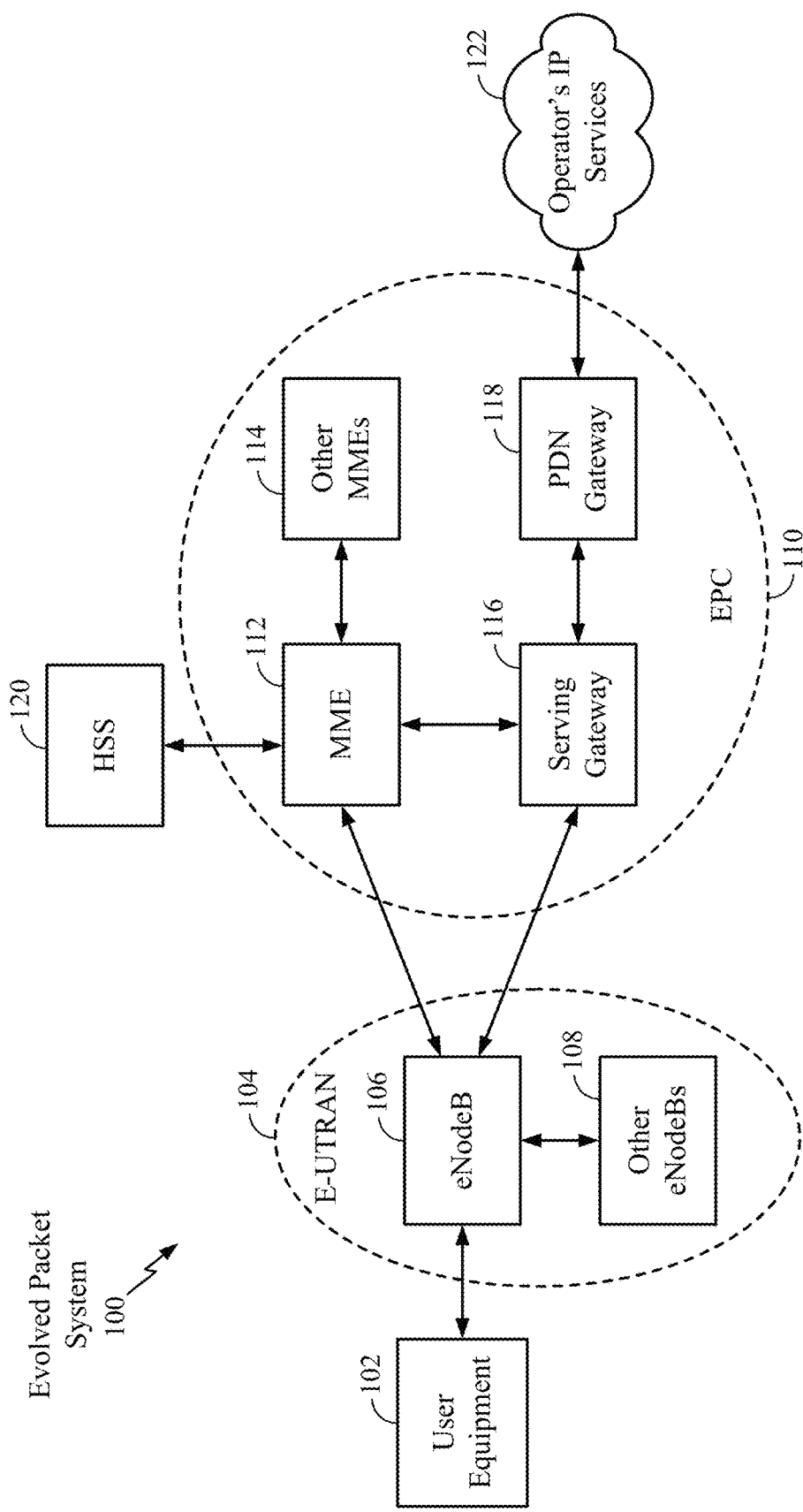
FIG. 1 is a diagram illustrating an example of a network architecture.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Aspects of the telecommunication systems are presented with reference to various apparatus and methods. These apparatus and methods are described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a non-transitory computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNodeB) 106 and other eNodeBs 108. The eNodeB 106 provides user and control plane protocol terminations toward the UE 102. The eNodeB 106 may be connected to the other eNodeBs 108 via a backhaul (e.g., an X2 interface). The eNodeB 106 may also be referred to as a base station, a base transceiver station, a radio base station, a radio transceiver, a transceiver function, a basic service set (BSS), an extended service set (ESS), or some other suitable terminology. The eNodeB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNodeB 106 is connected to the EPC 110 via, e.g., an Si interface. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, the Intranet, an IP Multimedia Subsystem (IMS), and a PS Streaming Service (PSS).

Figure 2:
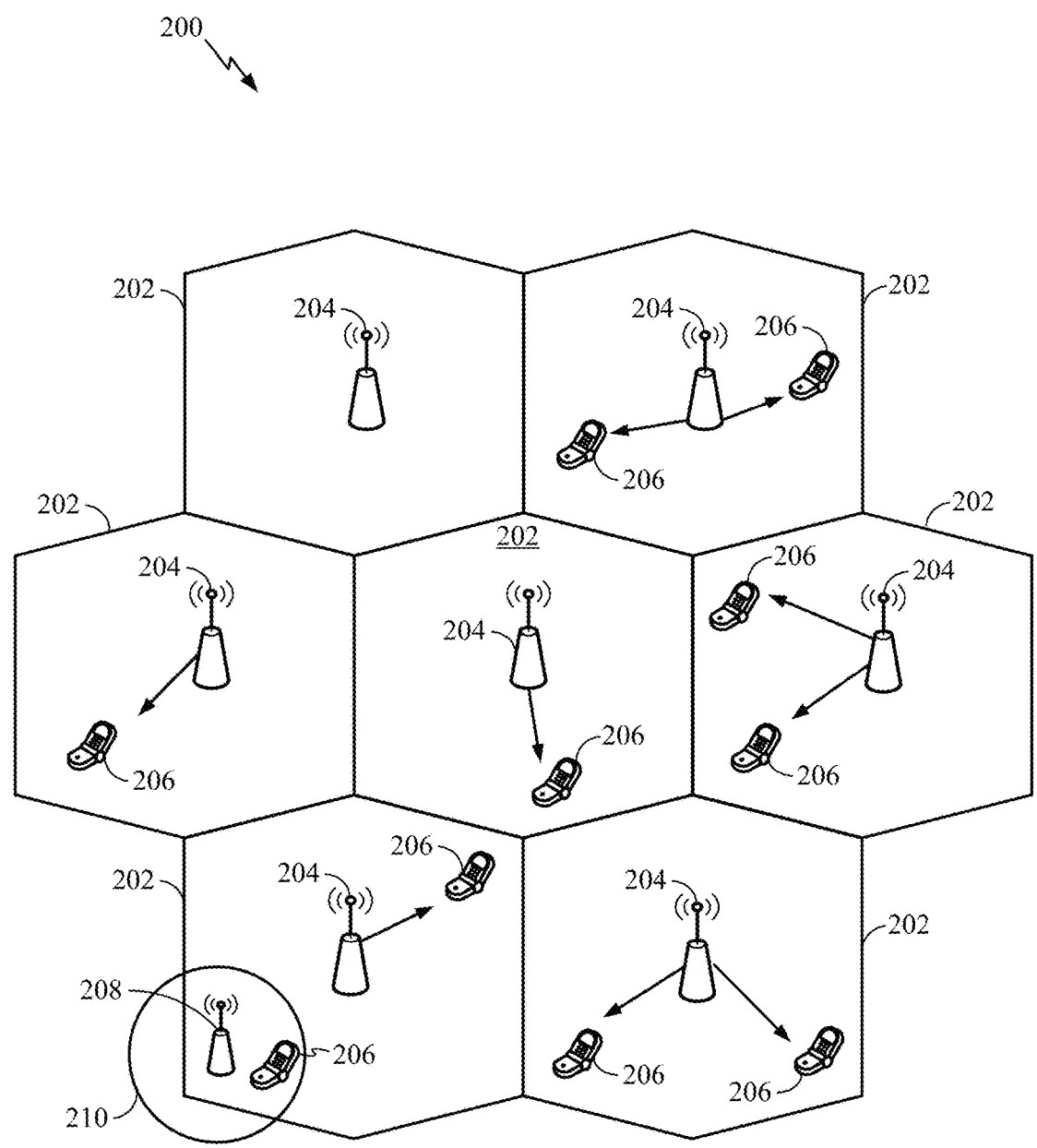
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNodeBs 208 may have cellular regions 210 that overlap with one or more of the cells 202. A lower power class eNodeB 208 may be a remote radio head (RRH), a femto cell (e.g., home eNodeB (HeNB)), a pico cell, or a micro cell. The macro eNodeBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNodeBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the downlink and SC-FDMA is used on the uplink to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA.

UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNodeBs 204 may have multiple antennas supporting MIMO technology. The use of MIMO technology enables the eNodeBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the downlink. The spatially precoded data streams arrive at the UE(s) 206 with different spatial signatures, which enables each of the UE(s) 206 to recover the one or more data streams destined for that UE 206. On the uplink, each UE 206 transmits a spatially precoded data stream, which enables the eNodeB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the downlink. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The uplink may use SC-FDMA in the form of a DFT-spread OFDM signal to compensate for high peak-to-average power ratio (PAPR).

Figure 3:
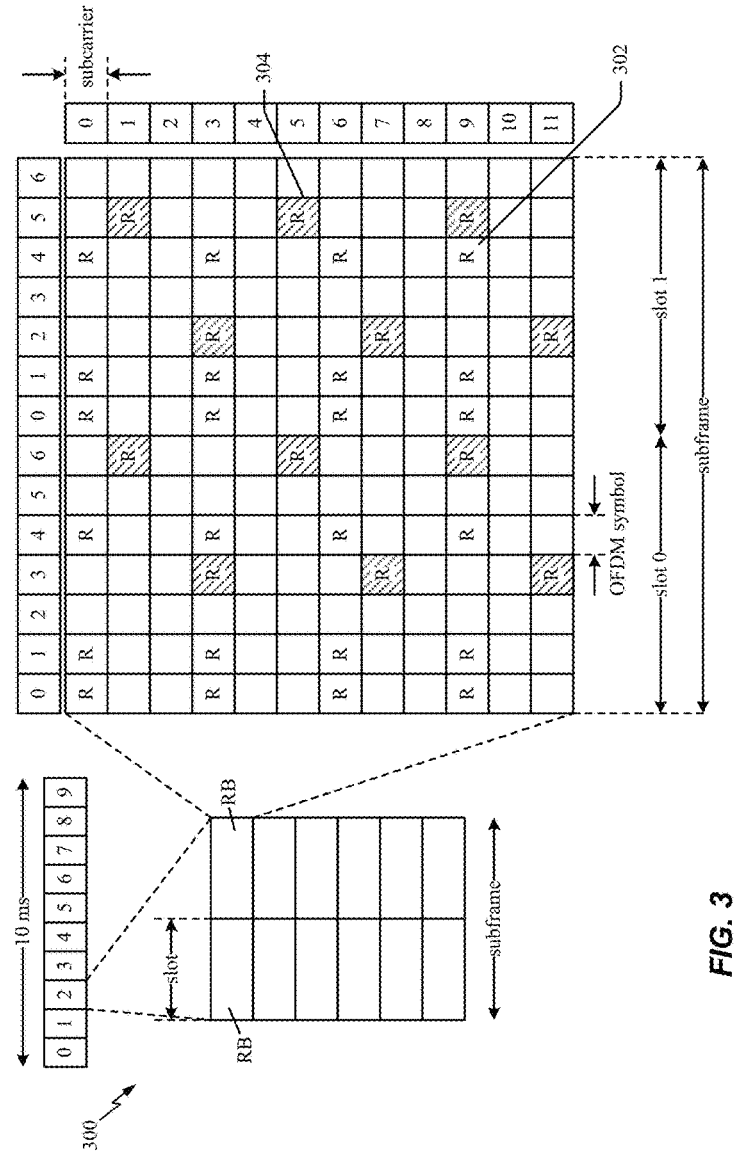
FIG. 3 is a diagram illustrating an example of a downlink frame structure in LTE.

FIG. 3 is a diagram 300 illustrating an example of a downlink frame structure in LTE. A frame (10 ms) may be divided into 10 equally sized sub-frames. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, 304, include downlink reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical downlink shared channel (PDSCH) is mapped. The number of bits carried by each resource element depends on the modulation scheme. Thus, the more resource blocks that a UE receives and the higher the modulation scheme, the higher the data rate for the UE.

Figure 4:
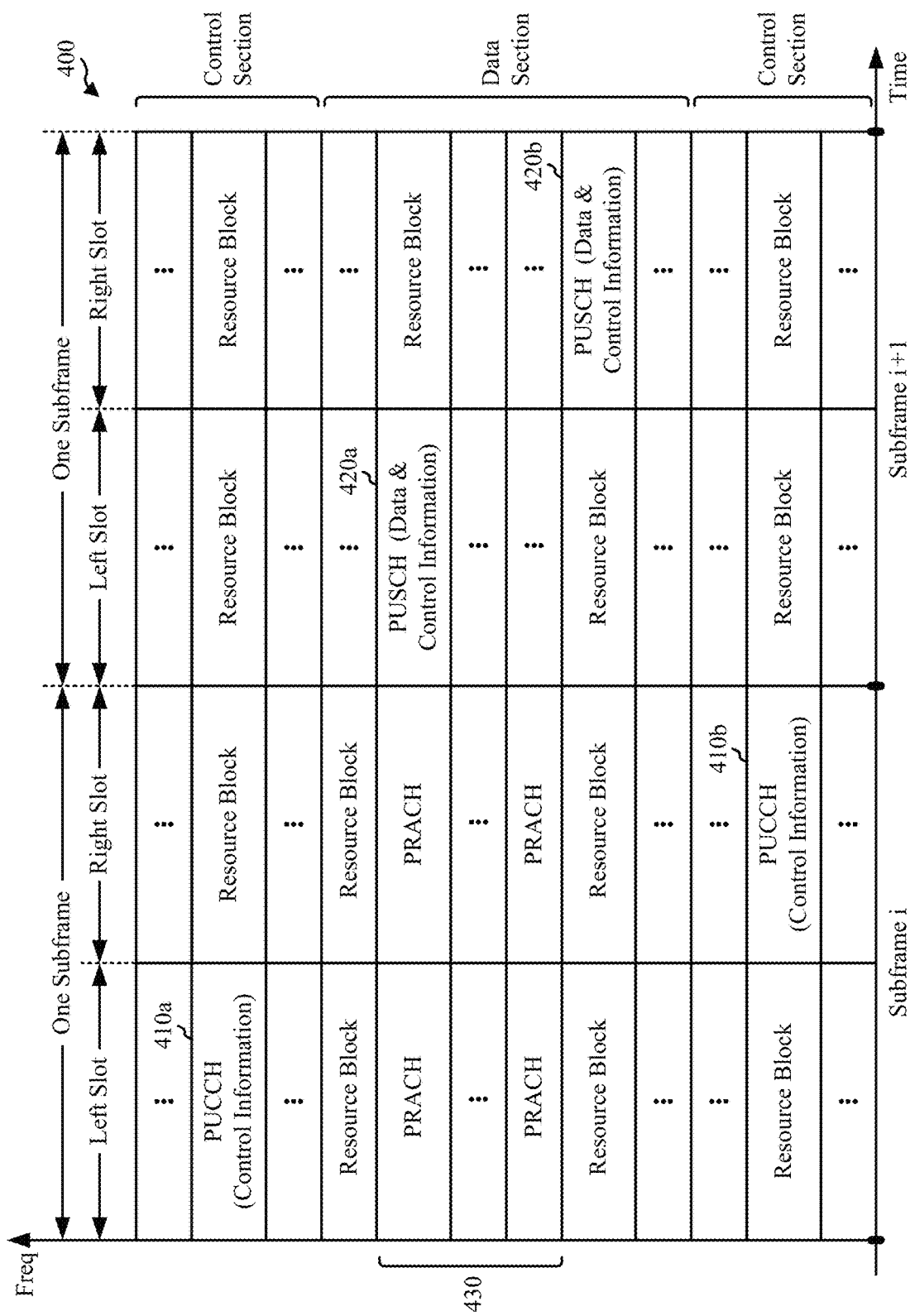
FIG. 4 is a diagram illustrating an example of an uplink frame structure in LTE.

FIG. 4 is a diagram 400 illustrating an example of an uplink frame structure in LTE. The available resource blocks for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The uplink frame structure results in the data section including contiguous subcarriers, which may allow a single UE to be assigned all of the contiguous subcarriers in the data section.

A UE may be assigned resource blocks 410a, 410b in the control section to transmit control information to an eNodeB. The UE may also be assigned resource blocks 420a, 420b in the data section to transmit data to the eNodeB. The UE may transmit control information in a physical uplink control channel (PUCCH) on the assigned resource blocks in the control section. The UE may transmit only data or both data and control information in a physical uplink shared channel (PUSCH) on the assigned resource blocks in the data section. An uplink transmission may span both slots of a subframe and may hop across frequency.

A set of resource blocks may be used to perform initial system access and achieve uplink synchronization in a physical random access channel (PRACH) 430. The PRACH 430 carries a random sequence. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
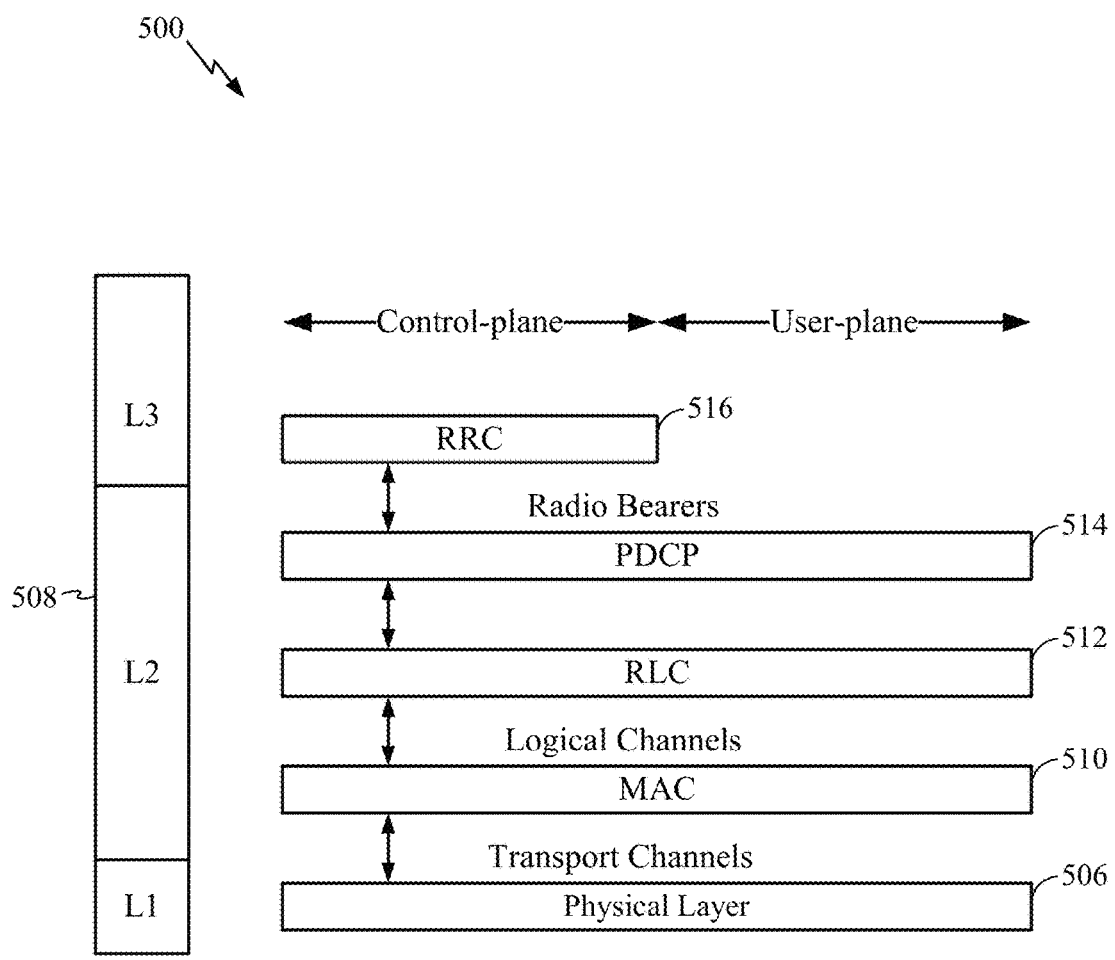
FIG. 5 is a diagram illustrating an example of a radio protocol architecture for the user and control plane.

FIG. 5 is a diagram 500 illustrating an example of a radio protocol architecture for the user and control planes in LTE. The radio protocol architecture for the UE and the eNodeB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNodeB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNodeB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNodeBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNodeB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNodeB and the UE.

Figure 6:
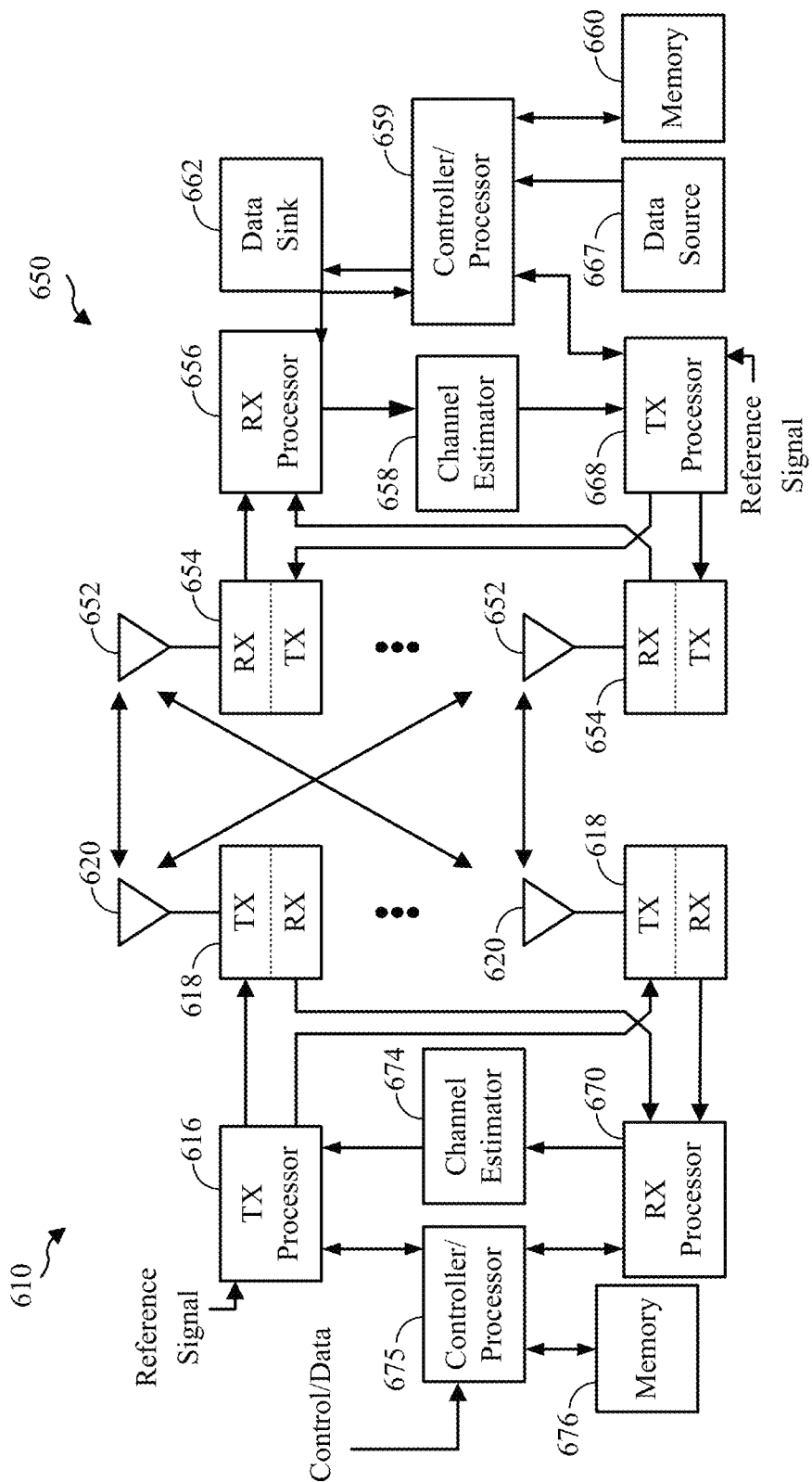
FIG. 6 is a diagram illustrating an example of an evolved Node B and user equipment in an access network.

FIG. 6 is a block diagram of an eNodeB 610 in communication with a UE 650 in an access network. In the downlink, upper layer packets from the core network are provided to a controller/processor 675. The controller/processor 675 implements the functionality of the L2 layer. In the downlink, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The TX processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receiver (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNodeB 610. These soft decisions may be based on channel estimates computed by the channel estimator 658. The soft decisions are then decoded and deinterleaved to recover the data and control signals that were originally transmitted by the eNodeB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the uplink, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the uplink, a data source 667 is used to provide upper layer packets to the controller/processor 659. The data source 667 represents all protocol layers above the L2 layer. Similar to the functionality described in connection with the downlink transmission by the eNodeB 610, the controller/processor 659 implements the L2 layer for the user plane and the control plane by providing header compression, ciphering, packet segmentation and reordering, and multiplexing between logical and transport channels based on radio resource allocations by the eNodeB 610. The controller/processor 659 is also responsible for HARQ operations, retransmission of lost packets, and signaling to the eNodeB 610.

Channel estimates derived by a channel estimator 658 from a reference signal or feedback transmitted by the eNodeB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The uplink transmission is processed at the eNodeB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the uplink, the controller/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figure 7:
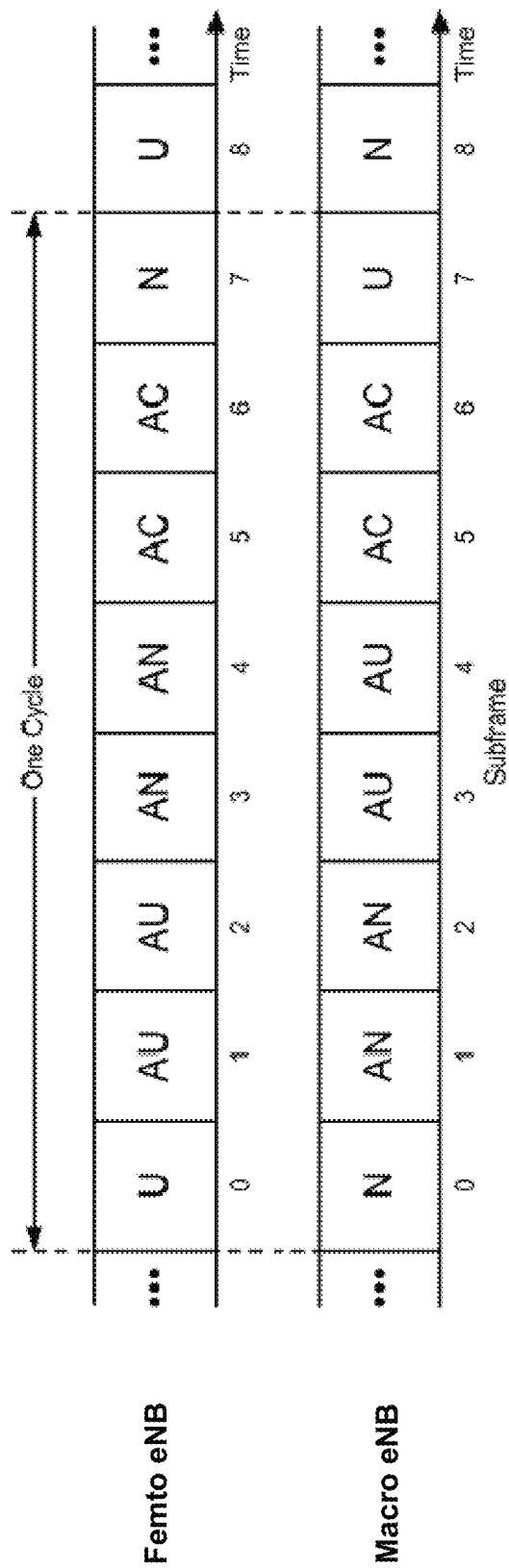
FIG. 7 is a block diagram conceptually illustrating adaptive resource partitioning in a heterogeneous network according to one aspect of the disclosure.

FIG. 7 is a block diagram illustrating TDM partitioning in a heterogeneous network according to one aspect of the disclosure. A first row of blocks illustrate subframe assignments for a femto eNodeB, and a second row of blocks illustrate subframe assignments for a macro eNodeB. Each of the eNodeBs has a static protected subframe during which the other eNodeB has a static prohibited subframe. For example, the femto eNodeB has a protected subframe (U subframe) in subframe 0 corresponding to a prohibited subframe (N subframe) in subframe 0. Likewise, the macro eNodeB has a protected subframe (U subframe) in subframe 7 corresponding to a prohibited subframe (N subframe) in subframe 7. Subframes 1-6 are dynamically assigned as either protected subframes (AU), prohibited subframes (AN), and common subframes (AC). The dynamically assigned subframes (AU/AN/AC) are referred to herein collectively as "X" subframes. During the dynamically assigned common subframes (AC) in subframes 5 and 6, both the femto eNodeB and the macro eNodeB may transmit data.

Protected subframes (such as U/AU subframes) have reduced interference and a high channel quality because aggressor eNodeBs are prohibited from transmitting. Prohibited subframes (such as N/AN subframes) have no data transmission to allow victim eNodeBs to transmit data with low interference levels. Common subframes (such as C/AC subframes) have a channel quality dependent on the number of neighbor eNodeBs transmitting data. For example, if neighbor eNodeBs are transmitting data on the common subframes, the channel quality of the common subframes may be lower than the protected subframes. Channel quality on common subframes may also be lower for cell range expansion (CRE) UEs strongly affected by aggressor eNodeBs. A CRE UE may belong to a first eNodeB but also be located in the coverage area of a second eNodeB. For example, a UE communicating with a macro eNodeB that is near the range limit of a femto eNodeB coverage is a CRE UE.

Carrier Aggregation

LTE-Advanced UEs use spectrum in up to 20 Mhz bandwidths allocated in a carrier aggregation of up to a total of 100 Mhz (5 component carriers) used for transmission in each direction. Generally, less traffic is transmitted on the uplink than the downlink, so the uplink spectrum allocation may be smaller than the downlink allocation. For example, if 20 Mhz is assigned to the uplink, the downlink may be assigned 100 Mhz. These asymmetric FDD assignments conserve spectrum and are a good fit for the typically asymmetric bandwidth utilization by broadband subscribers.

Figure 8:
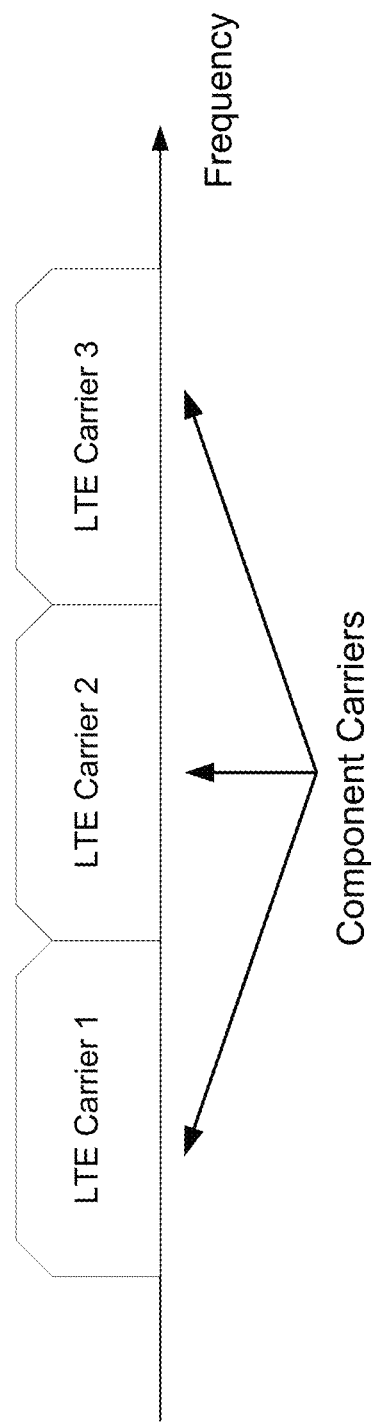
FIG. 8 discloses a continuous carrier aggregation type.
Figure 9:
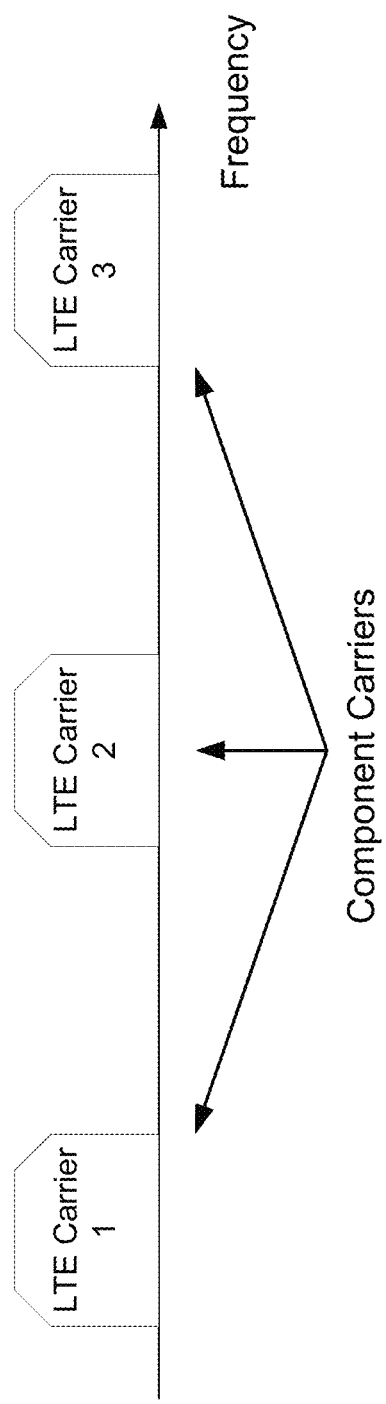
FIG. 9 discloses a non-continuous carrier aggregation type.

For the LTE-Advanced mobile systems, two types of carrier aggregation (CA) methods have been proposed, continuous CA and non-continuous CA. They are illustrated in FIGS. 8 and 9. Non-continuous CA occurs when multiple available component carriers are separated along the frequency band (FIG. 9). On the other hand, continuous CA occurs when multiple available component carriers are adjacent to each other (FIG. 8). Both non-continuous and continuous CA aggregate multiple LTE/component carriers to serve a single unit of LTE Advanced UE.

Multiple RF receiving units and multiple FFTs may be deployed with non-continuous CA in LTE-Advanced UE since the carriers are separated along the frequency band. Because non-continuous CA supports data transmissions over multiple separated carriers across a large frequency range, propagation path loss, Doppler shift and other radio channel characteristics may vary a lot at different frequency bands.

Thus, to support broadband data transmission under the non-continuous CA approach, methods may be used to adaptively adjust coding, modulation and transmission power for different component carriers. For example, in an LTE-Advanced system where the enhanced NodeB (eNodeB) has fixed transmitting power on each component carrier, the effective coverage or supportable modulation and coding of each component carrier may be different.

Figure 10:
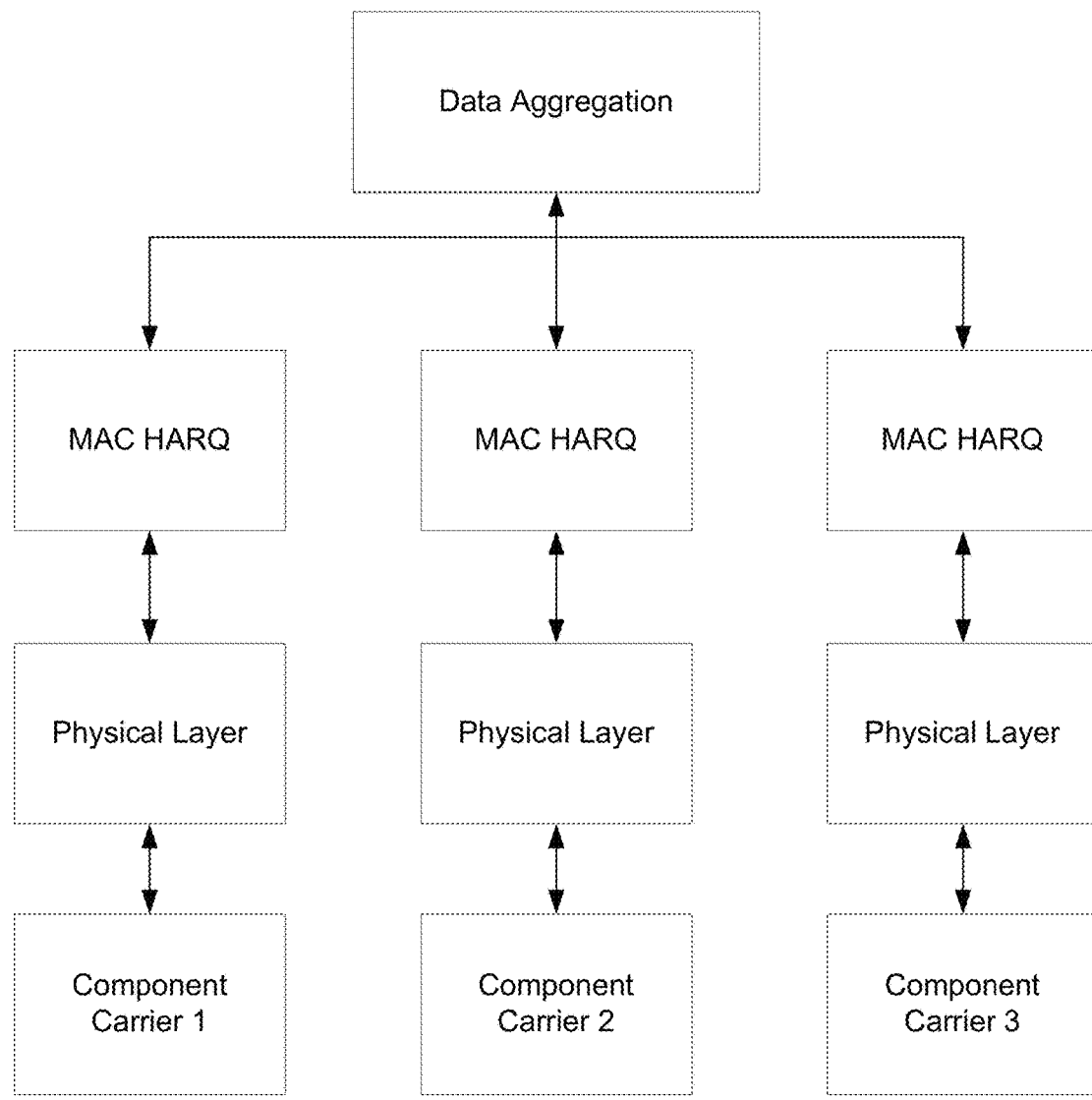
FIG. 10 discloses MAC layer data aggregation.

FIG. 10 illustrates aggregating transmission blocks (TBs) from different component carriers at the medium access control (MAC) layer (FIG. 5) for an IMT-Advanced system. With MAC layer data aggregation, each component carrier has its own independent hybrid automatic repeat request (HARQ) entity in the MAC layer and its own transmission configuration parameters (e.g., transmitting power, modulation and coding schemes, and multiple antenna configuration) in the physical layer. Similarly, in the physical layer, one HARQ entity is provided for each component carrier.

In general, there are different approaches for deploying control channel signaling for multiple component carriers. One approach involves a minor modification of the control structure in LTE systems where each component carrier is given its own coded control channel.

Another approach involves jointly coding the control channels of different component carriers and deploying the control channels in a dedicated component carrier. The control information for the multiple component carriers is integrated as the signaling content in this dedicated control channel. As a result, backward compatibility with the control channel structure in LTE systems is maintained, while signaling overhead in the CA is reduced.

In yet another approach, multiple control channels for different component carriers are jointly coded and then transmitted over the entire frequency band. This approach offers low signaling overhead and high decoding performance in control channels, at the expense of high power consumption at the UE side. However, this method is not compatible with LTE systems.

It is preferable to support transmission continuity during the handover procedure across multiple cells when CA is used for IMT-Advanced UE. However, reserving sufficient system resources (i.e., component carriers with good transmission quality) for the incoming UE with specific CA configurations and quality of service (QoS) requirements may be challenging for the next eNodeB. The reason is that the channel conditions of two (or more) adjacent cells (eNodeBs) may be different for the specific UE. In one approach, the UE measures the performance of only one component carrier in each adjacent cell. This offers similar measurement delay, complexity, and energy consumption as that in LTE systems. An estimate of the performance of the other component carriers in the corresponding cell may be based on the measurement result of the one component carrier. Based on this estimate, the handover decision and transmission configuration may be determined.

According to various examples, the UE operating in a multicarrier system (also referred to as carrier aggregation) is configured to aggregate certain functions of multiple carriers, such as control and feedback functions, on the same carrier, which may be referred to as a "primary carrier." The remaining carriers that depend on the primary carrier for support are referred to as associated secondary carriers. For example, the UE may aggregate control functions such as those provided by the optional dedicated channel (DCH), the nonscheduled grants, a physical uplink control channel (PUCCH), and/or a physical downlink control channel (PDCCH). Signaling and payload may be transmitted both on the downlink by the eNode B to the UE, and on the uplink by the UE to the eNodeB.

In some examples, there may be multiple primary carriers. In addition, secondary carriers may be added or removed without affecting the basic operation of the UE, including physical channel establishment and radio link failure (RLF) procedures which are layer 2 and layer 3 procedures, such as in the 3GPP technical specification 36.331 for the LTE RRC protocol.

Figure 11:
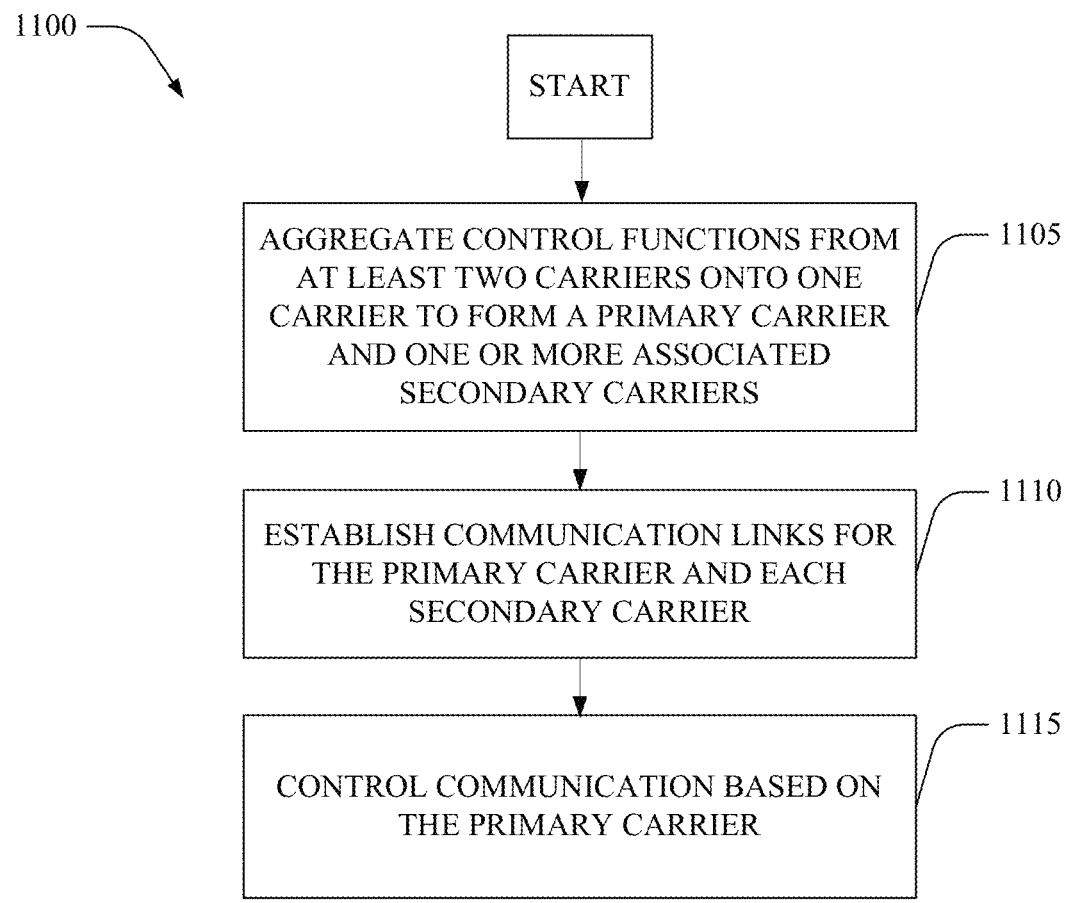
FIG. 11 is a block diagram illustrating a method for controlling radio links in multiple carrier configurations.

FIG. 11 illustrates a method 1100 for controlling radio links in a multiple carrier wireless communication system by grouping physical channels according to one example. As shown, the method includes, at block 1105, aggregating control functions from at least two carriers onto one carrier to form a primary carrier and one or more associated secondary carriers. Next at block, 1110, communication links are established for the primary carrier and each secondary carrier. Then, communication is controlled based on the primary carrier in block 1115.

Coexistence Between Legacy Carrier Types and New Carrier Types

A carrier type that is defined before LTE Release 11 is referred to as legacy carrier type (LCT). LTE Release 11 has introduced a new carrier type (NCT) in the context of carrier aggregation. The NCT is not backwards compatible. Aspects of the present disclosure are directed to configuring an operator with a single carrier to multiplex LCT UEs and NCT UEs using the same carrier. Another aspect of the present disclosure is directed to configuring an operator with a single carrier to operate two different schemes on the same carrier.

The NCT does not specify new detection and/or acquisition signals. Still, the NCT may specify new time and/or frequency configurations of existing signals. Additionally, for non-synchronized new carriers, the primary synchronization signal and secondary synchronization signal (PSS/SSS) sequences are transmitted. In one configuration, it may be desirable to prevent a LCT UE from acquiring the PSS/SSS of a NCT.

The NCT may carry one reference signal (RS) port within one subframe with a 5 ms periodicity. The reference signal port may include the Release 8 CRS Port 0 resource elements (REs) for each physical resource block (PRB) and Release 8 sequence. The reference signal (RS) port for the NCT is not used for demodulation. The bandwidth for the NCT may be a full system bandwidth (BW), a minimum bandwidth, and/or configurable between a full system bandwidth and a minimum bandwidth. The minimum bandwidth may be selected based on the following equation: (min (system BW, X), where X is selected from {6, 25} resource blocks (RBs). The common reference signal does not transmit on all subframes or across the full bandwidth.

In some cases, changing the time-frequency location of the PSS/SSS may prevent acquisition of a new carrier; affect inter-cell interference coordination (ICIC); and promote demodulation reference signal (DM-RS) avoidance in the central six physical resource blocks (PRBs). The PSS/SSS performance is taken into account when modifying the PSS/SSS.

One aspect of the present disclosure is directed to coexistence and transition between the NCT and the LCT. In one configuration, spectrum compatibility is maintained throughout the coexistence of the NCT and the LCT. Moreover, in this configuration, spectrum compatibility is also maintained throughout transition between the NCT and the LCT. In another configuration, when an operator has more than one carrier, the carriers may be partitioned. Additionally, in some cases, load balancing between the NCT and the LCT for different users may be performed. In another configuration, the NCT and the LCT schemes are adaptively applied to improve the system throughput.

One aspect of the present disclosure is directed to a frequency division multiplexing (FDM) application to improve coexistence between the NCT and the LCT. In a system where the operator has multiple carriers (e.g., {f1, f2, f3, . . . }), the coexistence of the NCT and the LCT may be supported. For example, coexistence may be supported for the following configurations in a two carrier system with a first carrier f1 and a second carrier f2, where PCC is the primary component carrier, SCC is the secondary component carrier, LCT is the legacy carrier type, and NCT is the new carrier type:

f1 (LCT, PCC)+f2 (LCT, SCC)—Release 10 Carrier aggregation (CA);
f1 (LCT, PCC)+f2 (NCT, SCC)—Release 11 CA;
f1 (NCT, PCC)+f2 (LCT, SCC)—Release 12 CA; and
f1 (NCT, PCC)+f2 (NCT, SCC)—Release 12 CA.

In LTE Releases prior to LTE Release 12, the LCT is specified as the anchor carrier. Additionally, cross carrier scheduling is supported for a downlink control channel for the LCT. In cross carrier scheduling, transmissions for different carriers are scheduled from the anchor carrier. In LTE Release 12, the NCT may be specified as the anchor carrier and enhanced downlink control channel based cross carrier scheduling is supported. Alternately, cross-carrier scheduling may not be specified for the enhanced downlink control channel (ePDCCH), still, the NCT primary component carrier (PCC) may carry the uplink control channel, such as the PUCCH.

In one configuration, TDM allows LCT UEs on the NCT. In this configuration, the NCT is configured as a primary component carrier with restricted measurements. The measurement restrictions are applied to the LCT UEs. Specifically, measurement restrictions may be applied to the LCT UEs because the LCT UEs typically measure the CRS in every subframe. More specifically, for a LCT UE to function on the NCT, the LCT UE cannot measure every subframe. A measurement restriction will instruct the LCT UE not to measure CRS, without leaving the LCT mode. In subframes serving LCT UEs, the downlink control channel is specified in addition to a full bandwidth common reference signal (CRS).

In the present application, the LCT UE may sometimes be referred to as a legacy UE. Additionally, the NCT UE may sometimes be referred to as a new UE.

Another aspect of the present disclosure is directed to the application of time division multiplexing (TDM) to the NCT and the LCT. TDM may be applied to support both NCT and the LCT on the same carrier. In one configuration, the subframes that should not be measured may be masked as another type of subframe. The masking of the subframes may be similar to the almost blank subframe (ABS) function of a heterogeneous network. That is, the ABS function specifies that a UE should not measure specific subframes.

In the TDM application, a carrier may be declared as a NCT or a LCT even though the carrier may include both LCT subframes and NCT subframes. That is, some subframes are declared as LCT but conform to the NCT. In one configuration, a carrier may be declared as a carrier type that is different from the carrier type declared for some subframes by restricting the subframe procedure similar to HetNet for clean and non-clean subframes (e.g., almost blank subframes (ABS)).

FIG. 12A is a block diagram illustrating NCT and LCT partitioning of subframes network according to one aspect of the disclosure. For example, the LCT UE may be instructed that a first set of subframes are restricted so that the NCT UE may transmit a signal on the first set of subframes. As shown in FIG. 12A, subframes 5-9 (SF5-SF9) may be declared as NCT subframes, therefore, the LCT UE may be instructed that subframes 5-9 are restricted subframes. Additionally, the NCT UE may be instructed that a second set of subframes are restricted. Thus, the NCT UE does not use the second set of subframes and the LCT signals are transmitted via the second set of subframes. As shown in FIG. 12A, subframes 0-4 (SF0-SF4) may be declared as LCT subframes, therefore, the NCT UE may be instructed that subframes 0-9 are restricted subframes.

FIG. 12B is a block diagram illustrating NCT and LCT partitioning of subframes network according to another aspect of the disclosure. In another configuration, as shown in FIG. 12B, a LCT signal (PSS/SSS and CRS) is transmitted on subframes 0 and 5. Both NCT UEs and LCT UEs may recognize and read subframes 0, 5. The NCT UEs are not scheduled on subframe 1 (SF 1) and the LCT UEs will read SF 1. The NCT UEs will not read SF 1 because they are not scheduled for SF 1. The LCT UEs are instructed that SF 2 is a restricted subframe so the LCT UEs will not read SF 2. The NCT UEs will then read SF 2. The remaining subframes may be designated as either NCT subframes or LCT subframes (LCT/NCT) based on the configuration of the network.

In another configuration, a restricted measurement may be applied to almost blank subframes (ABS), multi-broadcast single frequency network (MBSFN) subframes, and/or discontinues reception (DRX) subframes to orthogonalize LCT and NCT waveforms. The partition can change over time depending on the loading of LCT and NCT terminals. Currently, TDM partitioning is limited to the connected state. Still, the concept may be extended to the idle state for a complete split. Further, the NCT operation may be advertised in a LCT carrier similar to MBSFN subframes, effectively acting as a blank subframe with no LCT channels. In another configuration, the TDM application is extended beyond the LCT and NCT to provide coexistence of any non-compatible features.

TDM partitioning may be based on the supported subframe type. In one configuration, five types of subframes are specified. Specifically, two types of subframes support LCT UEs and three types of subframes support NCT UEs. In this example, the LCT UEs are UEs configured according to LTE Release 8-10.

The two types of subframes that support LCT UEs may be type 1 and type 2 subframes. That is, type 1 (SF1) are MBSFN subframes with a control region and a common reference signal (CRS). Additionally, type 2 subframes (SF2) are non-MBSFN subframes with at least a 1-port CRS. Furthermore, type 2 subframes allow CRS based demodulation for at least some UEs, with LCT control The three types of subframes that support NCT UEs may be type 3, type 4, and type 5 subframes. That is, type 3 subframes (SF3) include MBSFN subframes without a LCT control region. Type 4 subframes (SF4) includes non-MBSFN subframes with a 1-port CRS. Additionally, type 4 subframes do not have a CRS based physical downlink shared channel (PDSCH). Moreover, type 4 subframes do not have LCT control. The type 4 subframes are similar to subframes 0 and 5 (SF 0, SF 5) with PSS/SSS/CRS for the NCT. Furthermore, type 5 subframes (SF5) include non-MBSFN subframes without any CRS and without a LCT control region. Additionally, in one configuration, transmissions for the NCT these three types of subframes may begin from the first symbol for an enhanced downlink control channel (ePDCCH) and a shared downlink channel (PDSCH).

UEs that are specified for LTE Release 11 may support the enhanced control channel (ePDCCH). Accordingly, the three subframe types for the NCT (i.e., types 4, 5 and 6) may also be supported by the LTE Release 11 UEs. Specifically, the LTE Release 11 UEs may use the three subframe types for the NCT if the enhanced control channel can either rate match around or be punctured by the CRS.

In one configuration, the TDM application to the LCT and NCT results in partitioning the five different subframe types between LCT UEs and NCT UEs. The TDM application may also specify flexible adaptation to meet traffic and loading conditions. Both NCT UEs and LCT UEs may use restricted measurement to reduce the impact on radio link management (RLM), radio resource management (RRM), and/or channel state information (CSI).

In one configuration, the uplink configuration remains the same. Thus, a LCT and a NCT may operate in downlink communications associated with the same LCT uplink.

Another aspect of the present disclosure is directed to primary synchronization signal/secondary synchronization signal (PSS/SSS) configurations. If the PSS/SSS are the same for both the NCT and the LCT, then both the NCT UEs and the LCT UEs may acquire timing and a physical cell identifier (PCI) from both the NCT and the LCT.

Alternatively, if different PSS/SSS are transmitted for NCT UEs, then the PSS/SSS is duplicated for both the NCT UEs and the LCT UEs so that both types of UEs may access the same carrier. In one configuration, the PSS location is the same and only the SSS locations are duplicated (e.g., one for NCT and one for LCT).

In another configuration, both the PSS and the SSS are kept the same for both the NCT and the LCT. Still, the sequence mapping of the CRS may be changed to differentiate the two carrier types. For example, the LCT UE may first search for the PSS and then search for the SSS. The LCT UE searches for the SSS to detect the cell ID and the cyclic prefix (CP) type.

If the SSS is placed differently in the NCT and the LCT, the LCT UE may find some non-relevant information but may still be able to deliver some candidate cell IDs. For example, in some cases, a threshold may not be specified, therefore, the SSS detection will deliver one or more candidates.

After searching for the PSS and the SSS, the UE may begin the reference signal received power (RSRP) measurements. During the RSRP measurements, the UE may detect non-relevant measurements. Nonetheless, these non-relevant measurements may be dropped over time. The non-relevant measurements may be measurements that do not satisfy S-criteria. S-criteria refers to a cell selection criteria, that is, a received signal is evaluated to determine whether the received signal exceeds a threshold.

In some cases, when the PSS/SSS location is maintained and the CRS sequence is remapped, the LCT UE will still proceed to measuring the RSRP. If the PSS/SSS location and CRS mapping are maintained for subframes 0 and 5, the LCT UE may obtain an RSRP measurement. Still, the RSRP measurement may be off by a specific dB value if the UE selects subframes other than subframes 0 or 5. Therefore, the LCT UE may not function with the NCT.

In another example, if the common reference signal (CRS) bandwidth is 25 resource blocks (RBs) in a 10 MHz system (50 RBs), it is possible to shift the location of the CRS to occupy the upper or lower 25 RBs.

Thus, in one configuration, the NCT UEs may access the network as a LCT UE. Still, the NCT UE may obtain information via the system information block (SIB) to determine a NCT location and/or random access channel resources.

Another aspect of the present disclosure is directed to idle mode considerations. In the case of carrier aggregation, where the secondary component carrier (SCC) is TDM'ed between the LCT and NCT, traffic issues may need to be resolved during a connected state. For single carrier operation with TDM'ed LCT and NCT, additional issues exist in the idle state, such as for paging occasions and shifting frame structure for NCT UEs.

In particular, paging occasions are defined in subframes 4, 4 and 9, or 4, 9, 0, and 5, depending on the network loading. The LCT UE is hashed to the paging occasion based on the international mobile subscriber identity (IMSI). Thus, in a worst case scenario, subframe four is available for LCT operation. In one configuration, the NCT UEs have the option to be paged on an orthogonal set of subframes as the LCT UEs (i.e., paging on orthogonal time). Still, a new hashing function may be defined.

In one configuration, the frame structure is shifted for NCT UEs. The frame structure shift may specify for a first set of UEs to have a first timing and second set of UEs to have a second timing. Additionally, the delivery of SIBs, radio link monitoring, and other procedures may also be separated due to different transmission modes.

In yet another aspect of the present disclosure, combined TDM and FDM applications are specified. For example, TDM may be applied for some subframes and FDM may be applied for other subframes. In particular, TDM may be first applied between the NCT and the LCT within a carrier and then FDM is applied between the NCT and the LCT for some subframes.

Alternately, in another configuration, TDM is applied for the downlink subframes and FDM is applied for the uplink subframes. In one example, there is FDM'ing between the NCT UEs and the LCT UEs for the uplink subframes, while maintaining TDM'ing for the downlink subframes.

Another aspect of the present disclosure is direct to different and adaptive bandwidth configurations. For example, the LCT may advertise a bandwidth that is different (e.g., smaller) from the actual bandwidth used for the NCT UE. Furthermore, the bandwidth may be adjusted over time to allow for flexible switching between the LCT and the NCT. Similarly, the uplink bandwidth may be advertised in system information blocks (SIBs) of the LCT and may change to adapt to the network.

Another aspect of the present disclosure is directed to FDM within the same carrier for the NCT and the LCT. For example, the LCT UE is informed of a 5 MHz spectrum while the NCT UE is informed of a 20 MHz spectrum.

In some cases, the LCT UEs may correctly perform measurements because the CRS is in the same structure as specified in LTE Release 8. In particular, the CRS spans the allowed measured bandwidth ("AllowedMeasBandwidth") signaled in SIB-3 and in MeasObjectEUTRA on the LCT. For example, the AllowedMeasBandwidth::=ENUMERATED {mbw6, mbw15, mbw25, mbw50, mbw75, mbw100}. That is, the UE may be signalled the allowed bandwidth for measurements in terms of number of RBs. For example, mbw6 is a measurement bandwidth of 6 RBs, mbw15 is a measurement bandwidth of 15 RBs, etc. Thus, if the NCT does not transmit CRS in the entire bandwidth, the LCT UEs are signalled the allowed bandwidth for performing measurements. Additionally, the AllowedMeasBandwidth is signaled to the LCT UE and matches the span of CRS in the NCT.

Another aspect of the present disclosure is directed to LCT UEs that read the physical broadcast channel (PBCH) to confirm cell detection. The physical broadcast channel may be transmitted in NCTs in a structure that is the same as a LCT structure. Optionally, the physical broadcast channel may be duplicated with the LCT format for LCT UEs.

Figure 13:
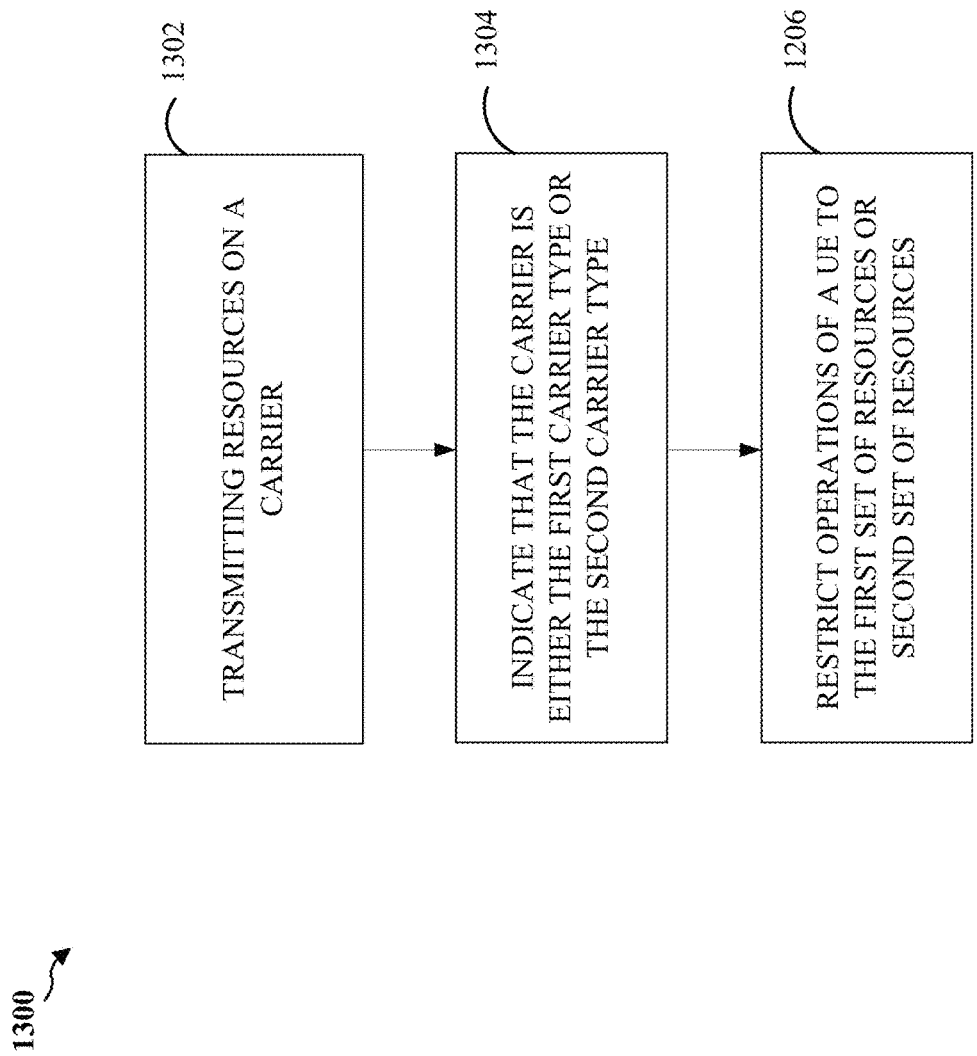
FIGS. 13-14 are block diagrams illustrating methods for enabling coexistence between carrier types, according to an aspect of the present disclosure.

FIG. 13 illustrates a method 1300 for coexistence between a legacy carrier type and a new carrier type. In block 1302, an eNodeB transmits resources on a carrier. The resources include a first set of resources associated with a first carrier type and a second set of resources associated with a second carrier type. The carrier is a frequency band used for communications. Additionally, the resources may include subframes and/or sub-bands. The first carrier type may be a legacy carrier type and the second carrier type may be a new carrier type.

The eNodeB indicates that the carrier is either the first carrier type or the second carrier type in block 1304. In one configuration, the indication may be based on signaling a reserved bit in the master information block (MIB) or the system information block (SIB) to indicate the carrier as the second carrier type. In another configuration, the indication may be based on a frequency band specified for the first carrier type and the second carrier type.

Furthermore, the eNodeB restricts operations of a UE to the first set of resources or second set of resources, in block 1306. In one configuration, the restriction is a restriction for a monitoring of paging occasions. In another configuration, the restriction is a restriction of measurements.

Figure 14:
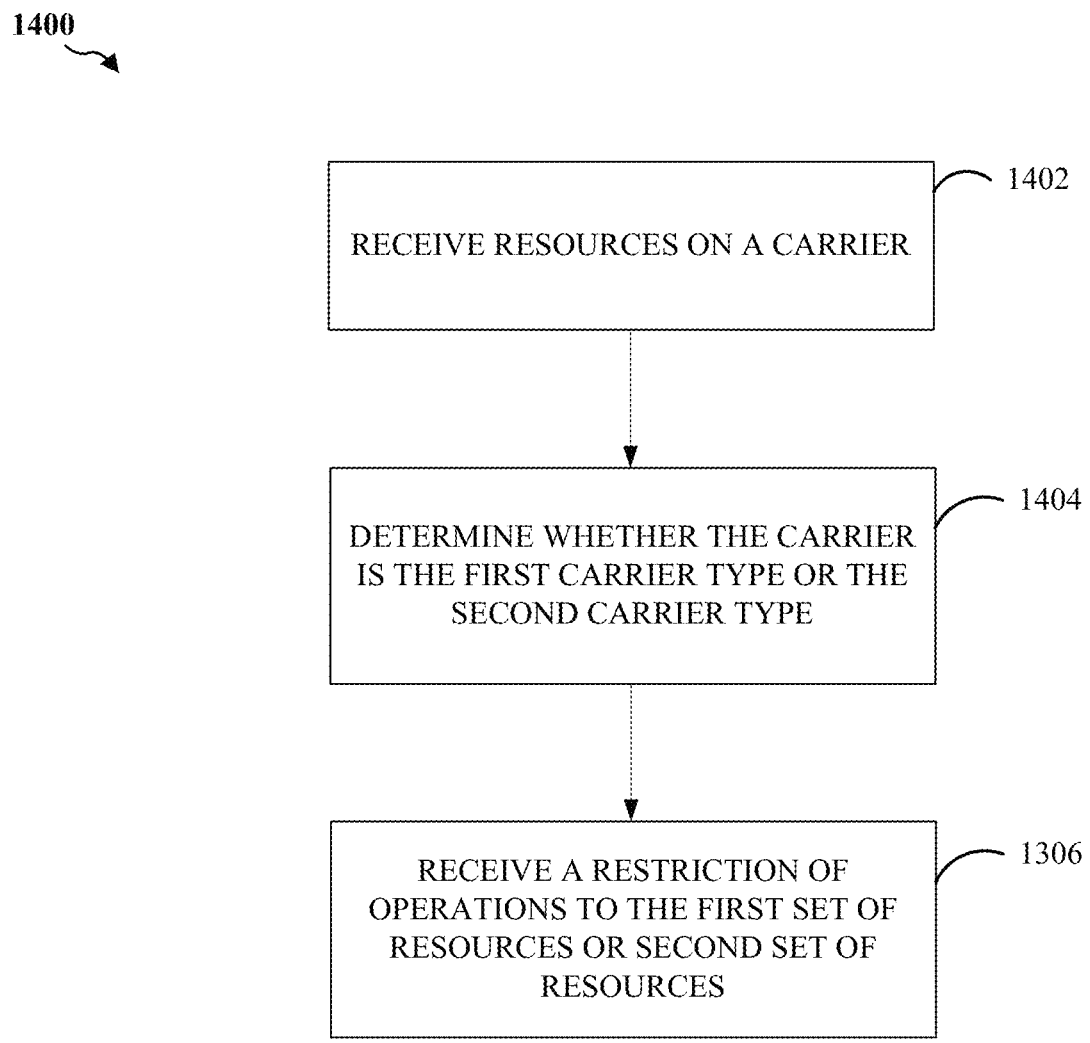

FIG. 14 illustrates a method 1400 for coexistence between a legacy carrier type and a new carrier type. In block 1402, a UE receives resources on a carrier. The resources include a first set of resources associated with a first carrier type and a second set of resources associated with a second carrier type. The carrier is a frequency band used for communications. Additionally, the resources may include subframes and/or sub-bands. The first carrier type may be a legacy carrier type and the second carrier type may be a new carrier type.

The UE determines whether the carrier is the first carrier type or the second carrier type in block 1404. In one configuration, the determination may be based on a reserved bit received in the master information block (MIB) or the system information block (SIB) to indicate the carrier as the second carrier type. In another configuration, the indication may be based on a frequency band specified for the first carrier type and the second carrier type.

Furthermore, the UE may receive a restriction of operations to the first set of resources or second set of resources, in block 1406. In one configuration, the restriction is a restriction for a monitoring of paging occasions. In another configuration, the restriction is a restriction of measurements.

Figure 15:
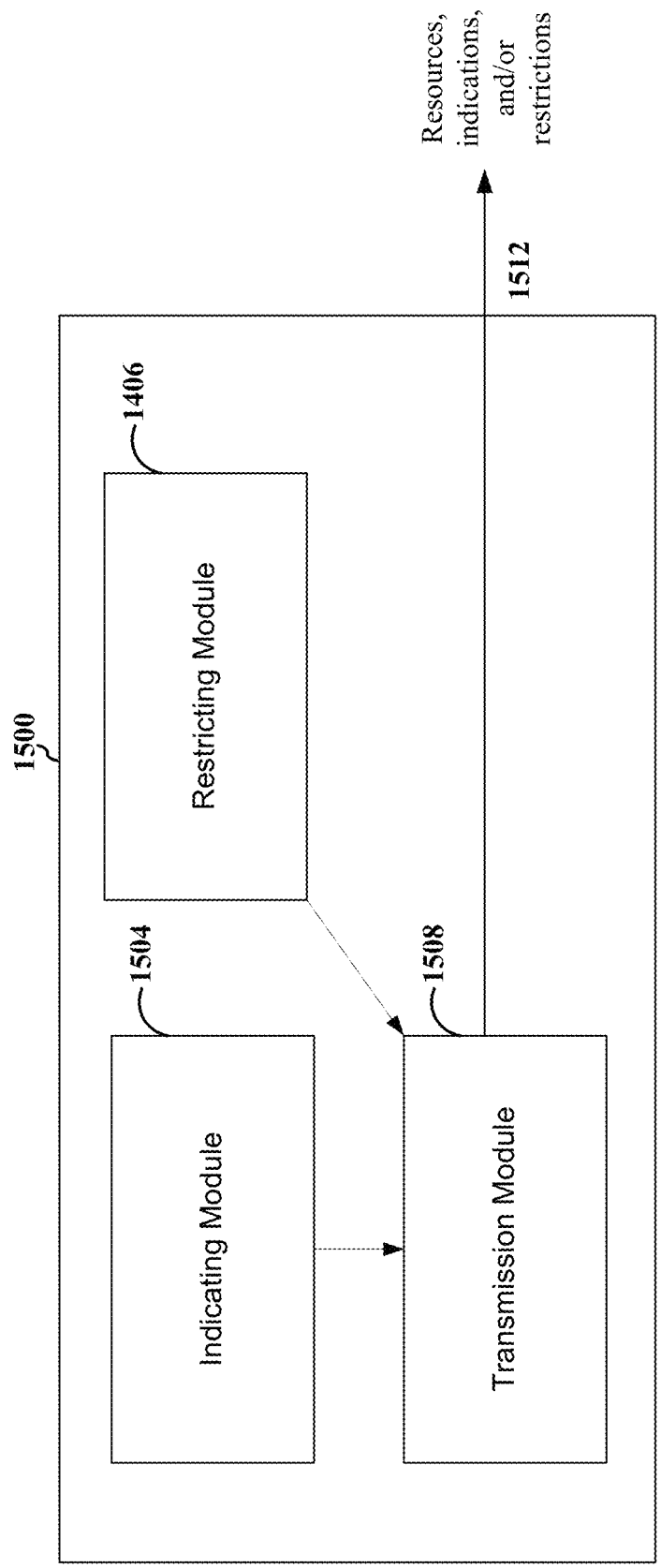
FIGS. 15-16 are conceptual data flow diagrams illustrating the data flow between different modules/means/components in an exemplary apparatus.

FIG. 15 is a conceptual data flow diagram illustrating the data flow between different modules/means/components in an exemplary apparatus 1500. The apparatus 1500 includes a indicating module 1504 that indicates whether the carrier is the first carrier type or the second carrier. The apparatus 1500 also includes a restricting module 1506 that restricts operations of a UE to the first set of resources or second set of resources. The apparatus 1500 includes a transmission module 1508. The transmission module 1508 transmits resources on a carrier. The carrier may be the signal 1512 transmitted via the transmission module 1508. The resources include a first set of resources associated with a first carrier type and a second set of resources associated with a second carrier type. Additionally, the indicating module 1504 may control the transmission module 1508 to transmit the indication via the signal 1512. Moreover, the restricting module 1506 may control the transmission module to transmit the restriction via the signal 1512. The apparatus may include additional modules that perform each of the steps of the process in the aforementioned flow chart of FIG. 13. As such, each step in the aforementioned flow chart of FIG. 13 may be performed by any module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 16:
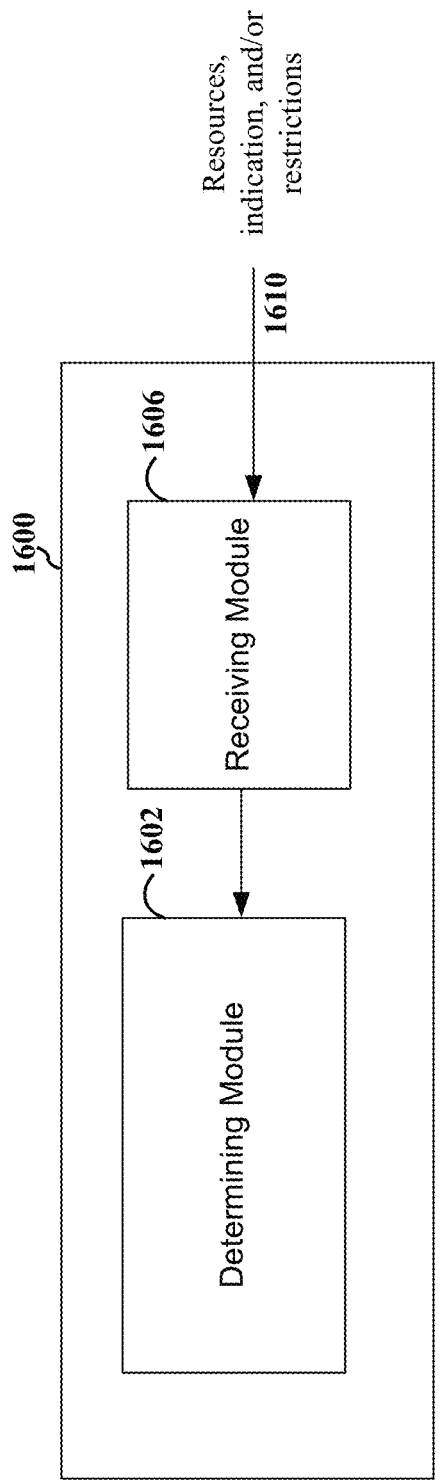

FIG. 16 is a conceptual data flow diagram illustrating the data flow between different modules/means/components in an exemplary apparatus 1600. The apparatus 1600 includes a receiving module 1606 that receives resources on a carrier. The resources include a first set of resources associated with a first carrier type and a second set of resources associated with a second carrier type. The carrier may be the signal 1610 received at the receiving module 1610. The apparatus 1600 also includes a determining module 1602 that determines whether the carrier is the first carrier type or the second carrier type. The determination may be performed based on an indication received via the signal 1610 received at the receiving module. The receiving module may also receive a restriction via the signal 1610. The restriction may restriction operations of the apparatus 1600 to the first set of resources or second set of resources. The apparatus may include additional modules that perform each of the steps of the process in the aforementioned flow chart of FIG. 14. As such, each step in the aforementioned flow chart of FIG. 14 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 17:
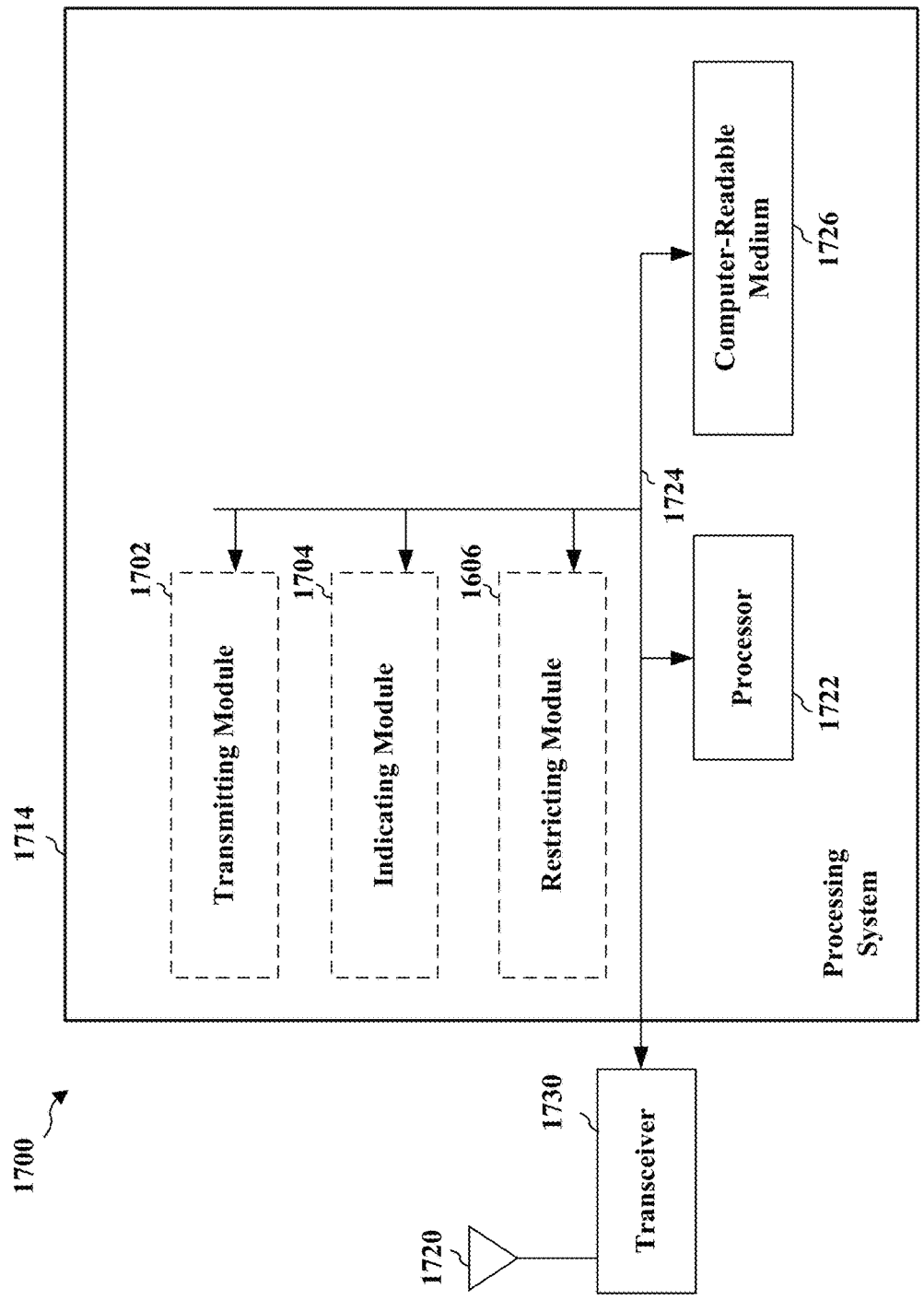
FIGS. 17-18 are block diagrams illustrating different modules/means/components in an exemplary apparatus.

FIG. 17 is a diagram illustrating an example of a hardware implementation for an apparatus 1700 employing a processing system 1714. The processing system 1714 may be implemented with a bus architecture, represented generally by the bus 1724. The bus 1724 may include any number of interconnecting buses and bridges depending on the specific application of the processing system 1714 and the overall design constraints. The bus 1724 links together various circuits including one or more processors and/or hardware modules, represented by the processor 1722 the modules 1702, 1704, 1706 and the computer-readable medium 1726. The bus 1724 may also link various other circuits such as timing sources, peripherals, voltage regulators, and power management circuits, which are well known in the art, and therefore, will not be described any further.

The apparatus includes a processing system 1714 coupled to a transceiver 1730. The transceiver 1730 is coupled to one or more antennas 1720. The transceiver 1730 enables communicating with various other apparatus over a transmission medium. The processing system 1714 includes a processor 1722 coupled to a computer-readable medium 1726. The processor 1722 is responsible for general processing, including the execution of software stored on the computer-readable medium 1726. The software, when executed by the processor 1722, causes the processing system 1714 to perform the various functions described for any particular apparatus. The computer-readable medium 1726 may also be used for storing data that is manipulated by the processor 1722 when executing software.

The processing system 1714 includes a transmitting module 1702 for transmitting resources on a carrier. The processing system 1714 also includes an indicating module 1704 for indicating that the carrier is either the first carrier type or the second carrier type. The processing system 1714 may further include a restricting module 1706 for restricting operations of a UE to the first set of resources or second set of resources. The modules may be software modules running in the processor 1722, resident/stored in the computer-readable medium 1726, one or more hardware modules coupled to the processor 1722, or some combination thereof. The processing system 1714 may be a component of the UE 650 and may include the memory 660, and/or the controller/processor 659.

Figure 18:
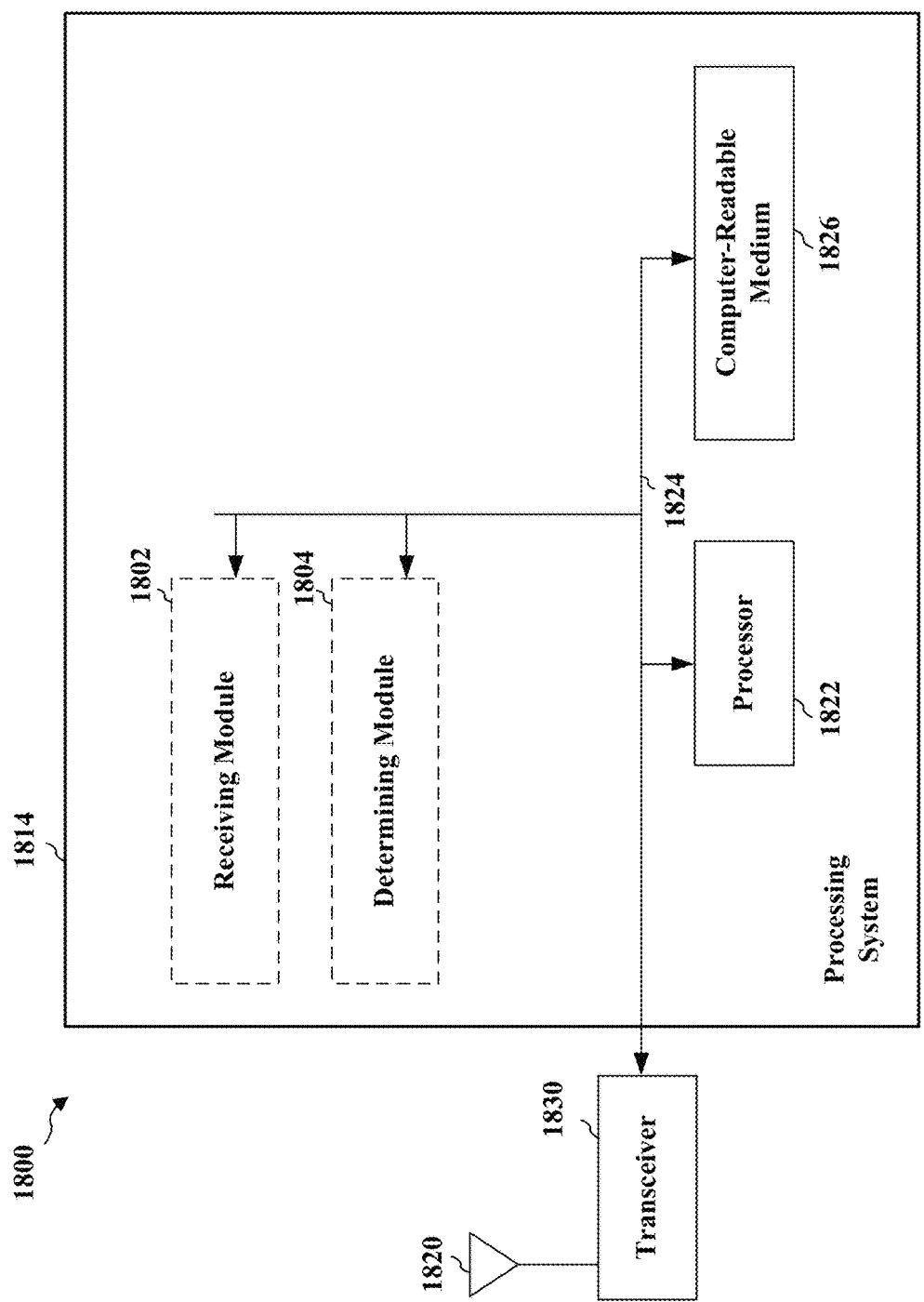

FIG. 18 is a diagram illustrating an example of a hardware implementation for an apparatus 1800 employing a processing system 1814. The processing system 1814 may be implemented with a bus architecture, represented generally by the bus 1824. The bus 1824 may include any number of interconnecting buses and bridges depending on the specific application of the processing system 1814 and the overall design constraints. The bus 1824 links together various circuits including one or more processors and/or hardware modules, represented by the processor 1822 the modules 1802, 1804, and the computer-readable medium 1826. The bus 1824 may also link various other circuits such as timing sources, peripherals, voltage regulators, and power management circuits, which are well known in the art, and therefore, will not be described any further.

The apparatus includes a processing system 1814 coupled to a transceiver 1830. The transceiver 1830 is coupled to one or more antennas 1820. The transceiver 1830 enables communicating with various other apparatus over a transmission medium. The processing system 1814 includes a processor 1822 coupled to a computer-readable medium 1826. The processor 1822 is responsible for general processing, including the execution of software stored on the computer-readable medium 1826. The software, when executed by the processor 1822, causes the processing system 1814 to perform the various functions described for any particular apparatus. The computer-readable medium 1826 may also be used for storing data that is manipulated by the processor 1822 when executing software.

The processing system 1814 includes a receiving module 1802 for resources on a carrier. The receiving module 1802 may also receive restrictions for operations of the processing system 1814 to a first set of resources or a second set of resources. The processing system 1814 also includes a determining module 1804 for determining whether the carrier is the first carrier type or the second carrier type. The modules may be software modules running in the processor 1822, resident/stored in the computer-readable medium 1826, one or more hardware modules coupled to the processor 1822, or some combination thereof. The processing system 1814 may be a component of the UE 650 and may include the memory 660, and/or the controller/processor 659.

In one configuration, the eNodeB 610 is configured for wireless communication including means for transmitting, means for indicating, and means for restricting. In one aspect, the transmitting means, the restricting means, and the indicating means may be the controller/processor 675, memory 676, transmit processor 616, modulators 618, and/or antenna 620 configured to perform the functions recited by the transmitting means, the restricting means, and the indicating means. In another configuration, the aforementioned means may be any module or any apparatus configured to perform the functions recited by the aforementioned means.

In one configuration, the UE 650 is configured for wireless communication including means for receiving. In one configuration, the receiving means may be the controller/processor 659, memory 660, receive processor 656, modulators 654, and/or antenna 652 configured to perform the functions recited by the receiving means. The UE 650 is also configured for wireless communication including means for determining. In one configuration, the determining means may be the controller/processor 659, memory 660, and/or receive processor 656 configured to perform the functions recited by the determining means. In another configuration, the aforementioned means may be any module or any apparatus configured to perform the functions recited by the aforementioned means.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
   transmitting resources on a carrier, the resources including a first set of resources associated with a first carrier type and a second set of resources associated with a second carrier type;
   indicating that the carrier is either the first carrier type or the second carrier type; and
   restricting operations of a user equipment (UE) to the first set of resources or the second set of resources.

2. The method of claim 1, in which the first carrier type comprises a legacy carrier type and the second carrier type comprises a new carrier type.

3. The method of claim 1, in which the carrier is a frequency band for communications.

4. The method of claim 1, further comprising advertising a bandwidth that is different than an actual bandwidth being used.

5. The method of claim 1, in which the operations comprise paging occasions, and the first set of resources are orthogonal from the second set of resources.

6. The method of claim 5, further comprising defining paging occasions based at least in part on network loading.

7. The method of claim 5, further comprising defining at least one first subframe for monitoring paging occasions for a first carrier type UE and at least one second subframe for monitoring paging occasions for a second carrier type UE.

8. The method of claim 7, in which the second carrier type UE uses additional subframes for paging monitoring in comparison to the first carrier type UE.

9. The method of claim 5, further comprising defining a new hashing function to map to a new paging location.

10. The method of claim 1, in which the indicating comprises transmitting a reserved bit in a master information block (MIB) or a system information block (SIB) to indicate the carrier as the second carrier type.

11. The method of claim 1, in which the operations comprise monitoring the first set of resources or the second set of resources.

12. The method of claim 1, in which the resources comprise subframes or sub-bands.

13. A method of wireless communication, comprising:
   receiving resources on a carrier, the resources including a first set of resources associated with a first carrier type and a second set of resources associated with a second carrier type;
   determining whether the carrier is the first carrier type or the second carrier type; and
   receiving a restriction of operations to the first set of resources or the second set of resources.

14. The method of claim 13, in which the first carrier type comprises a legacy carrier type and the second carrier type comprises a new carrier type.

15. The method of claim 13, in which the carrier is a frequency band for communications.

16. The method of claim 13, in which the operations comprise paging occasions, and the first set of resources are orthogonal from the second set of resources.

17. The method of claim 13, in which the determining is based at least in part on a reserved bit in a master information block (MIB) or a system information block (SIB) to indicate the carrier is the second carrier type.

18. The method of claim 13, in which the operations comprise monitoring the first set of resources or the second set of resources.

19. The method of claim 13, in which the resources comprise subframes or sub-bands.

20. An apparatus for wireless communications, comprising:
   a memory; and
   at least one processor coupled to the memory, the at least one processor being configured:
      to transmit resources on a carrier, the resources including a first set of resources associated with a first carrier type and a second set of resources associated with a second carrier type;
      to indicate that the carrier is either the first carrier type or the second carrier type; and
      to restrict operations of a user equipment (UE) to the first set of resources or the second set of resources.

21. The apparatus of claim 20, in which the first carrier type comprises a legacy carrier type and the second carrier type comprises a new carrier type.

22. The apparatus of claim 20, in which the carrier is a frequency band for communications.

23. The apparatus of claim 20, in which the at least one processor is further configured to advertise a bandwidth that is different than an actual bandwidth being used.

24. The apparatus of claim 20, in which the operations comprise paging occasions, and the first set of resources are orthogonal from the second set of resources.

25. The apparatus of claim 24, in which the at least one processor is further configured to define paging occasions based at least in part on network loading.

26. The apparatus of claim 24, in which the at least one processor is further configured to define at least one first subframe for monitoring paging occasions for a first carrier type UE and at least one second subframe for monitoring paging occasions for a second carrier type UE.

27. The apparatus of claim 26, in which the second carrier type UE uses additional subframes for paging monitoring in comparison to the first carrier type UE.

28. The apparatus of claim 24, in which the at least one processor is further configured to define a new hashing function to map to a new paging location.

29. The apparatus of claim 20, in which the at least one processor is further configured to indicate by transmitting a reserved bit in a master information block (MIB) or a system information block (SIB) to indicate the carrier as the second carrier type.

30. The apparatus of claim 20, in which the operations comprise monitoring the first set of resources or the second set of resources.

31. The apparatus of claim 20, in which the resources comprise subframes or sub-bands.

32. An apparatus for wireless communications, comprising:
   a memory; and
   at least one processor coupled to the memory, the at least one processor being configured:
      to receive resources on a carrier, the resources including a first set of resources associated with a first carrier type and a second set of resources associated with a second carrier type;
      to determine whether the carrier is the first carrier type or the second carrier type; and
      to receive a restriction of operations to the first set of resources or the second set of resources.

33. The apparatus of claim 32, in which the first carrier type comprises a legacy carrier type and the second carrier type comprises a new carrier type.

34. The apparatus of claim 32, in which the carrier is a frequency band for communications.

35. The apparatus of claim 32, in which the operations comprise paging occasions, and the first set of resources are orthogonal from the second set of resources.

36. The apparatus of claim 32, in which the at least one processor is configured to determine based at least in part on a reserved bit in a master information block (MIB) or a system information block (SIB) to indicate the carrier is the second carrier type.

37. The apparatus of claim 32, in which the operations comprise monitoring the first set of resources or the second set of resources.

38. The apparatus of claim 32, in which the resources comprise subframes or sub-bands.

39. An apparatus for wireless communications, comprising:
   means for transmitting resources on a carrier, the resources including a first set of resources associated with a first carrier type and a second set of resources associated with a second carrier type;
   means for indicating that the carrier is either the first carrier type or the second carrier type; and
   means for restricting operations of a user equipment (UE) to the first set of resources or the second set of resources.

40. An apparatus for wireless communications, comprising:
- means for receiving resources on a carrier, the resources including a first set of resources associated with a first carrier type and a second set of resources associated with a second carrier type;
- means for determining whether the carrier is the first carrier type or the second carrier type; and
- means for receiving a restriction of operations to the first set of resources or the second set of resources.

41. A non-transitory computer-readable medium having program code recorded thereon, the program code comprising:
- program code to transmit resources on a carrier, the resources including a first set of resources associated with a first carrier type and a second set of resources associated with a second carrier type;
- program code to indicate that the carrier is either the first carrier type or the second carrier type; and
- program code to restrict operations of a user equipment (UE) to the first set of resources or the second set of resources.

42. A non-transitory computer-readable medium having program code recorded thereon, the program code comprising:
- program code to receive resources on a carrier, the resources including a first set of resources associated with a first carrier type and a second set of resources associated with a second carrier type;
- program code to determine whether the carrier is the first carrier type or the second carrier type; and
- program code to receive a restriction of operations to the first set of resources or the second set of resources.

43. The method of claim 1, in which at least one of:
- a timing configuration of the first carrier type is different from a timing configuration of the second carrier type;
- a frequency configuration of the first carrier type is different from a frequency configuration of the second carrier type; or
- a combination thereof.

44. The method of claim 13, in which at least one of:
- a timing configuration of the first carrier type is different from a timing configuration of the second carrier type;
- a frequency configuration of the first carrier type is different from a frequency configuration of the second carrier type; or
- a combination thereof.

45. The apparatus of claim 20, in which at least one of:
- a timing configuration of the first carrier type is different from a timing configuration of the second carrier type;
- a frequency configuration of the first carrier type is different from a frequency configuration of the second carrier type; or
- a combination thereof.

46. The apparatus of claim 32, in which at least one of:
- a timing configuration of the first carrier type is different from a timing configuration of the second carrier type;
- a frequency configuration of the first carrier type is different from a frequency configuration of the second carrier type; or
- a combination thereof.

47. The apparatus of claim 39, in which at least one of:
- a timing configuration of the first carrier type is different from a timing configuration of the second carrier type;
- a frequency configuration of the first carrier type is different from a frequency configuration of the second carrier type; or
- a combination thereof.

48. The apparatus of claim 40, in which at least one of:
- a timing configuration of the first carrier type is different from a timing configuration of the second carrier type;
- a frequency configuration of the first carrier type is different from a frequency configuration of the second carrier type; or
- a combination thereof.

49. The non-transitory computer-readable medium of claim 41, in which at least one of:
- a timing configuration of the first carrier type is different from a timing configuration of the second carrier type;
- a frequency configuration of the first carrier type is different from a frequency configuration of the second carrier type; or
- a combination thereof.

50. The non-transitory computer-readable medium of claim 42, in which at least one of:
- a timing configuration of the first carrier type is different from a timing configuration of the second carrier type;
- a frequency configuration of the first carrier type is different from a frequency configuration of the second carrier type; or
- a combination thereof.

* * * * *